US012784342B2

(12) United States Patent
Langer et al.

(10) Patent No.: US 12,784,342 B2
(45) Date of Patent: Nov. 3, 2026

(54) EMBEDDING VECTORS FOR THREE-DIMENSIONAL MODELING

(71) Applicant: QUALCOMM Incorporated, San Diego, CA (US)

(72) Inventors: Florian Maximilian Langer, Cambridge (GB); Georgi Dikov, Amsterdam (NL); Jihong Ju, Amsterdam (NL); Gerhard Reitmayr, Del Mar, CA (US); Mohsen Ghafoorian, Diemen (NL)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 18/667,891

(22) Filed: May 17, 2024

(65) Prior Publication Data

US 2025/0278890 A1 Sep. 4, 2025

Related U.S. Application Data

(60) Provisional application No. 63/561,219, filed on Mar. 4, 2024.

(51) Int. Cl.
*G06T 17/00* (2006.01)
*G06N 20/00* (2019.01)

(52) U.S. Cl.
CPC ............. *G06T 17/00* (2013.01); *G06N 20/00* (2019.01)

(58) Field of Classification Search
CPC .......... G06T 17/00; G06T 2207/20084; G06N 20/00; G06N 3/045; G06N 3/08
See application file for complete search history.

(56) References Cited

U.S. PATENT DOCUMENTS

| | | | | |
|---|---|---|---|---|
| 2019/0205695 | A1* | 7/2019 | Yan | G06V 10/757 |
| 2021/0012166 | A1* | 1/2021 | Braley | G06F 18/251 |
| 2021/0192254 | A1* | 6/2021 | Rejeb Sfar | G06F 30/10 |

(Continued)

OTHER PUBLICATIONS

Cheng et al., "Learning 3D Dense Correspondence via Canonical Point Autoencoder", 35th Conference on Neural Information Processing Systems (NeurIPS 2021) (Year: 2021).*

*Primary Examiner* — Maurice L. Mcdowell, Jr.
(74) *Attorney, Agent, or Firm* — Polsinelli LLP/QUALCOMM Incorporated

(57) ABSTRACT

Systems and techniques are described herein for generating embedding vectors. For instance, a method for generating embedding vectors is provided. The method may include mapping, using a machine-learning encoder, a plurality of query point clouds and a plurality of sample point clouds associated with the plurality of query point clouds; and encoding the plurality of sample point clouds using the machine-learning encoder to generate an embedding space for a plurality of three-dimensional models. In some aspects, in the embedding space, geometrically similar objects are represented by similar embedding vectors and geometrically dissimilar objects are represented by dissimilar embedding vectors. In some aspects, mapping the plurality of query point clouds and the plurality of sample point clouds comprises training, using contrastive learning, the machine-learning encoder based on the plurality of query point clouds and the plurality of sample point clouds.

19 Claims, 16 Drawing Sheets

(56) References Cited

U.S. PATENT DOCUMENTS

| | | | | |
|---|---|---|---|---|
| 2021/0335039 | A1* | 10/2021 | Jones | G06V 10/82 |
| 2023/0204738 | A1* | 6/2023 | Gangundi | G01S 17/89<br>702/116 |
| 2023/0274533 | A1* | 8/2023 | Isobe | G06V 10/774<br>382/157 |
| 2023/0342979 | A1* | 10/2023 | Yang | G06V 10/454 |
| 2024/0135259 | A1* | 4/2024 | Ahlfeld | G06F 30/17 |
| 2024/0169698 | A1* | 5/2024 | Bansal | G06V 40/10 |
| 2024/0386671 | A1* | 11/2024 | Alawieh | G06T 17/05 |

* cited by examiner

504

502

EMBEDDING VECTORS FOR THREE-DIMENSIONAL MODELING

CROSS-REFERENCE TO RELATED APPLICATIONS

This application claims the benefit of U.S. Provisional Application No. 63/561,219, filed Mar. 4, 2024, which is incorporated herein by reference in its entirety.

TECHNICAL FIELD

The present disclosure generally relates to modeling of objects. For example, aspects of the present disclosure include systems and techniques for generating embedding vectors for three-dimensional (3D) modeling.

BACKGROUND

Representing scenes or environments (e.g., rooms, outdoor spaces, etc.) and/or objects within the environment using 3D models (e.g., aligned 3D computer-aided design (CAD) models) can improve representations of the environments and/or objects. Such improved representations may improve performance of downstream tasks, such as, extended reality (e.g., augmented reality (AR), virtual reality (VR), and/or mixed reality (MR)), robotics, vehicle systems (e.g., for autonomous or semi-autonomous driving systems), etc. For example, an accurate representation of an environment may improve collision detection, predictions, and/or warnings, rendering of image data (e.g., for XR), and/or physical simulations based on the representation of the environment.

Compared to 3D scene meshes or point clouds, a CAD-based representation has many advantages. For example, CAD-based representations lack holes in objects, clean surface geometry, object-level annotations, and potential part-level scene-understanding, whereas 3D meshes and point clouds may have holes in corresponding representations of scenes, may lack a clean surface geometry, among other deficiencies. CAD-based representations also offer a compact representation of an environment, with significantly fewer vertices and faces, allowing for faster rendering and collision simulations.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described for generating embedding vectors. According to at least one example, a method is provided for generating embedding vectors. The method includes: mapping, using a machine-learning encoder, a plurality of query point clouds and a plurality of sample point clouds associated with the plurality of query point clouds; and encoding the plurality of sample point clouds using the machine-learning encoder to generate an embedding space for a plurality of three-dimensional models.

In another example, an apparatus for generating embedding vectors is provided that includes at least one memory and at least one processor (e.g., configured in circuitry) coupled to the at least one memory. The at least one processor configured to: map, using a machine-learning encoder, a plurality of query point clouds and a plurality of sample point clouds associated with the plurality of query point clouds; and encode the plurality of sample point clouds using the machine-learning encoder to generate an embedding space for a plurality of three-dimensional models.

In another example, a non-transitory computer-readable medium is provided that has stored thereon instructions that, when executed by one or more processors, cause the one or more processors to: map, using a machine-learning encoder, a plurality of query point clouds and a plurality of sample point clouds associated with the plurality of query point clouds; and encode the plurality of sample point clouds using the machine-learning encoder to generate an embedding space for a plurality of three-dimensional models.

In another example, an apparatus for generating embedding vectors is provided. The apparatus includes: means for mapping, using a machine-learning encoder, a plurality of query point clouds and a plurality of sample point clouds associated with the plurality of query point clouds; and means for encoding the plurality of sample point clouds using the machine-learning encoder to generate an embedding space for a plurality of three-dimensional models.

In another example, a method is provided for detecting objects. The method includes: generating, using a machine-learning model, a shape embedding based on an input point cloud representative of a scene; comparing the shape embedding to shape embeddings of an embedding space to determine a matching shape embedding of the embedding space; and correlating an object in the scene with a model based on a relationship between the model and the matching shape embedding.

In another example, an apparatus for detecting objects is provided that includes at least one memory and at least one processor (e.g., configured in circuitry) coupled to the at least one memory. The at least one processor configured to: generate, using a machine-learning model, a shape embedding based on an input point cloud representative of a scene; compare the shape embedding to shape embeddings of an embedding space to determine a matching shape embedding of the embedding space; and correlate an object in the scene with a model based on a relationship between the model and the matching shape embedding.

In another example, a non-transitory computer-readable medium is provided that has stored thereon instructions that, when executed by one or more processors, cause the one or more processors to: generate, using a machine-learning model, a shape embedding based on an input point cloud representative of a scene; compare the shape embedding to shape embeddings of an embedding space to determine a matching shape embedding of the embedding space; and correlate an object in the scene with a model based on a relationship between the model and the matching shape embedding.

In another example, an apparatus for detecting objects is provided. The apparatus includes: means for generating, using a machine-learning model, a shape embedding based on an input point cloud representative of a scene; means for comparing the shape embedding to shape embeddings of an embedding space to determine a matching shape embedding of the embedding space; and means for correlating an object in the scene with a model based on a relationship between the model and the matching shape embedding.

In some aspects, one or more of the apparatuses described herein is, can be part of, or can include an extended reality device (e.g., a virtual reality (VR) device, an augmented reality (AR) device, or a mixed reality (MR) device), a vehicle (or a computing device, system, or component of a vehicle), a mobile device (e.g., a mobile telephone or so-called "smart phone", a tablet computer, or other type of mobile device), a smart or connected device (e.g., an Internet-of-Things (IoT) device), a wearable device, a personal computer, a laptop computer, a video server, a television (e.g., a network-connected television), a robotics device or system, or other device. In some aspects, each apparatus can include an image sensor (e.g., a camera) or multiple image sensors (e.g., multiple cameras) for capturing one or more images. In some aspects, each apparatus can include one or more displays for displaying one or more images, notifications, and/or other displayable data. In some aspects, each apparatus can include one or more speakers, one or more light-emitting devices, and/or one or more microphones. In some aspects, each apparatus can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
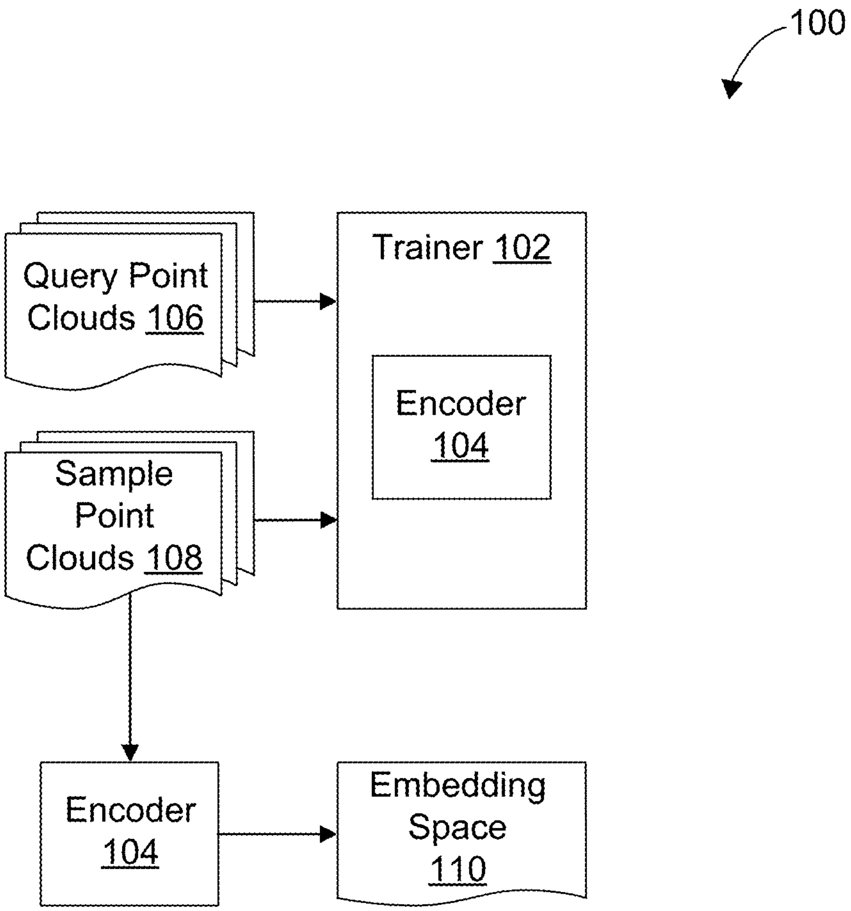
FIG. 1 is a block diagram illustrating an example system that may generate an embedding space, according to various aspects of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

As mentioned above, using three-dimensional (3D) models based on computer-aided design (CAD) models in a representation of an environment or scene may improve the representation of the environment/scene. For example, 3D models based on CAD models may be more dense and/or accurate as compared to 3D point clouds obtained live (e.g., in real time or near-real time) by a sensor (e.g., a depth sensor). Further, 3D models based on CAD models may provide for object and semantic-driven representation of scenes and/or objects, plausible and detailed geometries of scenes and/or objects, highly compressed representation of objects and/or scenes, and/or high-level of abstraction.

In some cases, an environment can be modeled using 3D CAD models using image scans (e.g., red, green, blue, depth (RGB-D) scans) of an environment as input. Predicted bounding boxes can be used to crop parts of a feature volume. The bounding boxes can be fed through an encoder to obtain shape embedding vectors. 3D correspondences can be predicted individually for each object, which can be optimized for rotation and translation. The run time of such a technique may be relatively long, for example, ranging from 2.5 seconds to 20 minutes, resulting in such a technique being unsuitable for real-time operation.

Another technique can include exhaustively rendering all CAD models in a database and optimizing a pose of the best fitting CAD model by comparing rendered depth images to observed ones. However, with run times of over 30 minutes, such a technique is not suited for real-time applications.

In another example, an environment can be modeled using 3D CAD models by taking videos (e.g., including RGB video frames) of an environment as input and predicting CAD model alignments from the posed RGB videos, detecting objects in each frame individually, and associating the detected objects across frames. Such a technique can then perform a multi-view optimization to find the best pose for each object. However, such a technique may not perform per-frame predictions and instead may rely on propagating information into a 3D scene volume and performing predictions in the 3D scene volume. Such a mechanism for creating a 3D feature volume is computationally expensive with possibly long run-times, preventing operation in an online setting.

Systems, apparatuses, methods (also referred to as processes), and computer-readable media (collectively referred to herein as "systems and techniques") are described herein for generating embedding vectors for three-dimensional (3D) modeling. According to some aspects, the systems and techniques can use the embedding vectors to train a machine-learning model (e.g., a neural network model) to use CAD models in a model of an environment or scene (e.g., based on a point-cloud representation of the environment or scene). In some cases, the trained machine-learning model can use the embedding vectors to identify CAD models for representing one or more objects in an environment or scene.

In some aspects, the systems and techniques described herein may map, or train, using contrastive learning, an embedding space machine-learning encoder (e.g., a neural network encoder) to generate an embedding space including embeddings (e.g., vector representations) of a plurality of three-dimensional models. For example, the systems and techniques can train the embedding space machine-learning encoder based on a plurality of query point clouds and a plurality of sample point clouds associated with the plurality of query point clouds. The systems and techniques may encode the plurality of sample point clouds using the trained embedding space machine-learning encoder to generate the embedding space for the plurality of three-dimensional models.

Additionally, in some aspects, the systems and techniques may train a model (e.g., CAD model) retrieval machine-learning model (e.g., a neural network model) using the embedding space. Further, in some aspects, the systems and techniques may provide a point cloud representative of a scene to the trained model retrieval machine-learning model and may obtain, from the trained model retrieval machine-learning model, a shape embedding representative of an object in the scene. The systems and techniques may match the shape embedding with a matching shape embedding of the embedding space. The systems and techniques can correlate the object with a 3D model (e.g., a 3D CAD model) based on a relationship between the 3D model and the matching shape embedding. The systems and techniques can then model the scene using the 3D model.

Using the systems and techniques described herein, the model retrieval machine-learning model can perform 3D model (e.g., 3D CAD model) retrieval and alignment more quickly than other techniques. In some cases, the model retrieval machine-learning model may be referred to herein as FastCAD. In some aspects, the model retrieval machine-learning model may perform CAD retrieval and alignment in real-time or substantially real time. For instance, the model retrieval machine-learning model may perform CAD model retrieval and alignment at a rate that allows generation of image data based on the retrieved CAD models at a frame rate and with a latency that is suitable for displaying the image data to a viewer. In one illustrative example, the model retrieval machine-learning model may retrieve and align CAD models in 100 milliseconds or less.

In some aspects, to achieve this real-time retrieval and alignment, the model retrieval machine-learning model may directly predict alignment parameters. This is different from other optimization-based methods. For example, in other optimization-based methods, nine degree of freedom (9DoF) alignment is obtained iteratively by minimizing rendering-based or geometry-based alignment objectives. It is also different from correspondence-based methods, where the network outputs object-to-CAD correspondences and 9DoF object poses are extracted with an additional alignment optimization. The alignments of the model retrieval machine-learning model are parameterized by oriented 3D bounding boxes where the discrete CAD model orientation is predicted within the bounding box. When learning the CAD orientation the systems and techniques take the symmetry of the aligned CAD model into account.

In some cases, the model retrieval machine-learning model can simultaneously solve object alignment and retrieval. This is not possible with previous methods, as alignment-from-correspondences is feasible only after a nearest-neighbor CAD model is retrieved. Furthermore, the systems and techniques do not require the predicted bounding boxes to crop parts of a feature volume from which shape embeddings can be predicted, but rather demonstrate that the bounding boxes can be predicted at the same time as shape embeddings of objects.

In some aspects, as noted previously, the embedding space from which the model retrieval machine-learning model retrieves 3D models (e.g., 3D CAD models) can be obtained by training a separate encoder network (e.g., the embedding space machine-learning encoder) using contrastive learning. For instance, noisy partial scans of one or more environments and clean CAD models can be embedded into a unified embedding space using a triplet loss. In some examples, when learning this embedding space, two auxiliary tasks can be performed. The two auxiliary tasks include performing foreground-background segmentation of object scans and predicting the similarity of positive and negative CAD model used for the contrastive learning setup. Including one or both of the auxiliary tasks can improve the final reconstruction and shape quality of the retrieved shapes for the embeddings.

The auxiliary tasks may be performed by additional machine-learning models (e.g., multi-layer perceptrons (MLPs)). The additional machine-learning models may be, or may include, thin layers of MLP heads on top of the machine-learning encoder. Performing the auxiliary tasks may involve training the two additional machine-learning models. The additional machine-learning models may be used to backpropagate loss terms that may be used in the training of the machine-learning encoder. However once the machine-learning encoder is trained (for creating the embedding space) the additional machine-learning models (e.g., the extra heads) may not be used.

Unlike previous methods, learning embeddings using the embedding space machine-learning encoder allows the model retrieval machine-learning model to retrieve 3D models (e.g., 3D CAD models) from a large database of models (e.g., with thousands of CAD models) as opposed to a small scene pool which are artificially guaranteed to contain a ground truth CAD model. For the predicted object detections in the model retrieval machine-learning model, the systems and techniques may use the predicted shape embeddings (e.g., embedding vectors) to retrieve the nearest neighbor CAD models from the embedding space. The retrieved CAD models can then be aligned according to the predicted bounding box with the predicted CAD orientation to form the final output.

According to some aspects, the systems and techniques may use the embedding space machine-learning encoder to learn an embedding space for 3D shapes (or objects) and may then train the model retrieval machine-learning model (e.g., FastCAD). In one illustrative example, the model retrieval machine-learning model may be, or may include, a sparse convolutional neural network (CNN) trained to predict object detections (and corresponding predicted bounding boxes) and corresponding shape embedding vectors from an input 3D point cloud. At inference of the model retrieval machine-learning model, the predicted embedding vectors may be used to retrieve the nearest CAD models from the embedding space, which are aligned according to the predicted bounding boxes and the orientations thereof.

As noted previously, when learning the embedding space using the embedding space machine-learning encoder, the systems and techniques may learn the shape embedding space using a contrastive learning setup. For the contrastive learning, the systems and techniques may embed noisy object point clouds from scans and clean point clouds sampled from CAD models into a unified embedding space. For this purpose, points (e.g., all points) within object bounding boxes can be selected as anchor objects. The point clouds of the annotated CAD model (e.g., used as an anchor point cloud) can be associated as positive examples. The systems and techniques can randomly sample point clouds of different CAD models of the same category as negative examples.

For each object, the anchor, positive, and negative point clouds are passed through an encoder network to produce embedding vectors $\omega$. A triplet loss is used to train the encoder network. In one illustrative example, the triplet loss can be defined as follows:

$$L = \max\left(0, d^2(A, P) + m - d^2(A, N)\right)$$

where A, P, and N are the embeddings of the anchor, positive and negative example respectively. The term d(A, B) denotes the L2 distance between vector A and B. The triplet loss ensures that the distance between the anchor and the positive example is smaller by a margin m than the distance between the anchor and the negative.

In some cases, the systems and techniques may learn the embedding space using the two auxiliary tasks noted previously. For example, in addition to the contrastive loss, the systems and techniques can train the embedding space machine-learning encoder to perform two auxiliary tasks. Doing so improves the quality of the retrieved shapes by the machine-learning model trained at the second step (e.g., FastCAD). The first task is to perform foreground/background segmentation of the input point clouds. The segmentation task undergoes a supervised learning using with a Binary Cross Entropy loss where the ratio of foreground to background points is balanced (as otherwise ca. 80%-90% belong to the object and are therefore foreground).

For the second task the systems and techniques train a machine-learning model (e.g., a shallow multi-layer perceptron (MLP)) to regress the Chamfer distance between the positive and the negative CAD model from their embeddings. The intuition behind introducing this is that sometimes the negative CAD model can be quite similar to the positive CAD model, while at other times it may be very different. Forcing the embedding network to learn embeddings containing such information is helpful for learning more useful embeddings in general. After training the embedding space machine-learning encoder network in this way the systems and techniques compute embeddings for all CAD models in a training data corpus.

The embeddings generated by the trained embedding space machine-learning encoder network are used as supervision when training the machine-learning model (e.g., FastCAD) to retrieve CAD models. Once trained the machine-learning model (e.g., FastCAD) can be used to predict embedding vectors based on scans (or images) of environments. The embedding vectors correspond to the embeddings of the embedding space.

Regarding the second step, the input to the machine-learning model (e.g., FastCAD) may be either a colored point cloud from an RGB-D scan or a colorless point cloud sampled from the reconstructed scene mesh obtained by applying a neural reconstruction method to a RGB Video. This point cloud is encoded into a feature volume in a backbone network using a set of sparse 3D convolutions followed by generative transposed convolutions in the neck. For a range of sampled locations $(\hat{x}, \hat{y}, \hat{z})$ these heads output classification probabilities p, bounding box parameters $\delta$, CAD orientation $\sigma$ and shape embedding vector $\omega$.

Depending on the average size of the predicted object class the head output at feature level 2 or 3 are returned (level 2 for small objects, level 3 for large objects). Shape embeddings $\omega$ may be predicted in parallel to bounding box parameters $\delta$. The bounding box parameters $\delta$ are not required to explicitly crop parts of the feature volume from which a shape embedding vector is decoded but rather demonstrate that both of them can be predicted in parallel, allowing for significant speed ups compared to other techniques.

Different to conventional 3D object detection networks the systems and techniques also predict the CAD orientation $\sigma$ which is predicted as a classification into the four quadrants in the xy-plane. This may be done because the heading angle contained in the bounding box parameters $\theta$ may not capture that information. When learning the CAD orientation the systems and techniques may leverage the symmetry annotation labels from Scan2CAD objects that label each object to either be non-symmetric or have 2-fold, 4-fold, or complete rotational symmetry around the up-axis. For 2-fold, 4-fold, and complete rotationally symmetric objects the systems and techniques modify our target orientation values from, for example, [1,0,0,0] to [0.5,0,0.5,0], [0.25, 0.25,0.25,0.25], or [0.25,0.25,0.25,0.25] respectively. This prevents the network from overfitting to arbitrary rotations for symmetric objects and allows it to generalize better. Through an assignment procedure some locations ($\hat{x}$, $\hat{y}$, $\hat{z}$) get matched with nearest ground truth objects. These locations then have ground truth labels associated with them and we can formulate a loss function as:

$$L = \frac{1}{N_{pos}} \sum_{\hat{x},\hat{y},\hat{z}} L_{cls}(\hat{p}, p) + \mathbb{1}_{\{p_{\hat{x},\hat{y},\hat{z}} \neq 0\}} \left(L_{bbox}(\hat{b}, b) + L_{orient}(\hat{\sigma}, \sigma) + L_{orient}(\hat{\omega}, \omega)\right)$$

where $N_{pos}$ is the total number of matched locations;

where the classification loss $L_{cls}$ is a focal loss;

where the bounding box loss $L_{bbox}$ is a 3D intersection over union (IoU) loss;

where the orientation loss $L_{orient}$ is a cross-entropy loss; and where the shape loss $L_{shape}$ is a mean-squared error (MSE) loss.

At test time for a given object detection and associated embedding prediction ω the nearest neighbor CAD model of the predicted category p is retrieved and aligned using the predicted bounding box b and orientation o.

Various aspects of the application will be described with respect to the figures below. Illustrative and non-limiting aspects and examples related to the present disclosure are included in Appendix A attached hereto, which is incorporated herein by reference in its entirety for all purposes.

FIG. 1 is a block diagram illustrating an example system 100 that may generate an embedding space 110, according to various aspects of the present disclosure. For example, a trainer 102 of system 100 may train, using a contrastive-learning approach, an encoder 104 (which may be referred to as an embedding space machine-learning encoder) using query point clouds 106 and sample point clouds 108. Query point clouds 106 may be associated with sample point clouds 108. In particular, query point clouds 106 and sample point clouds 108 may include point clouds based on the same objects. Once trained, encoder 104 may encode sample point clouds 108 to generate an embedding space 110 for a plurality of three-dimensional models. For example, embedding space 110 may represent, as embedding vectors, the objects represented by sample point clouds 108.

Query point clouds 106 and sample point clouds 108 may each include respective point-cloud representations of objects (e.g., objects common to environments, such as furniture, including, as examples, chairs, tables, desks, lamps, bookshelves, dressers, counters). Query point clouds 106 and sample point clouds 108 may include representations of the same objects. The representations of query point clouds 106 and sample point clouds 108 may be based on different sources. For example, the representations of query point clouds 106 may be based on point-cloud captures of a scene (e.g., red, green, blue, depth (RGB-D) captures or point cloud sampled from the reconstructed scene mesh obtained by applying a neural reconstruction method to a RGB video). Additionally or alternatively, one or more representations of sample point clouds 108 may be based on simulated captures of the objects. The representations of sample point clouds 108 may be based on computer-aided design (CAD) models of the objects. For example, query point clouds 106 may include a representation of a recliner that simulates a 3D capture of the recliner from a perspective. Sample point clouds 108 may include a representation of the recliner based on a CAD model of the recliner.

Trainer 102 may be, or may include, a training framework configured to train encoder 104. Trainer 102 may operate according to a contrastive-learning approach, for example, to train encoder 104 to correlate one of query point clouds 106 with a matching one of sample point clouds 108 based on the one of query point clouds 106 representing the same object as the one of sample point clouds 108.

Once trained, encoder 104 may encode the representations of sample point clouds 108 as embedding space 110. Embedding space 110 may include an embedding vector representative of each representation of sample point clouds 108.

Figure 2:
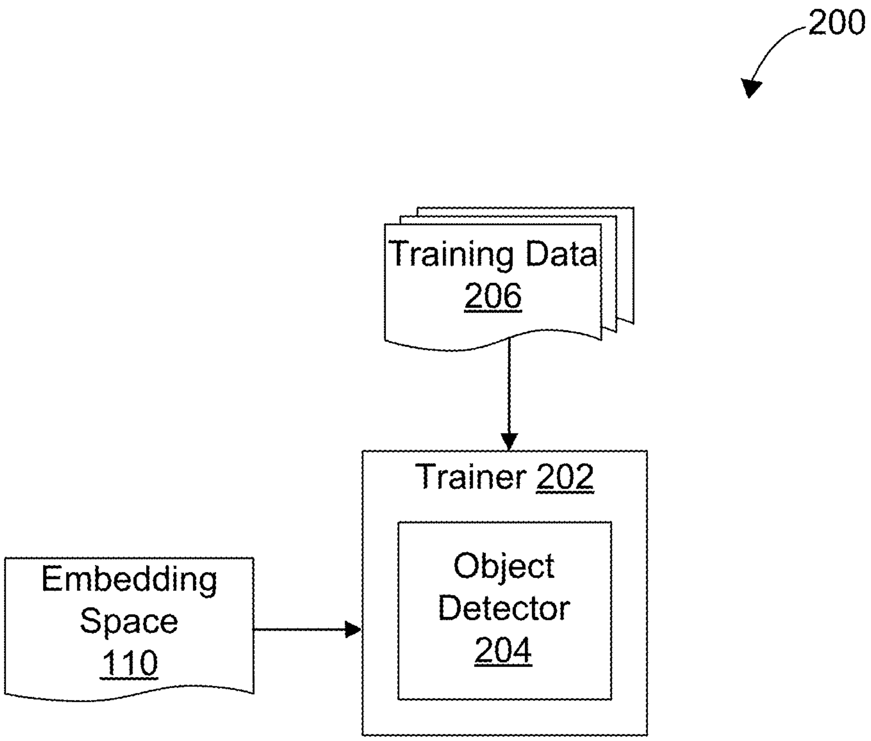
FIG. 2 is a block diagram illustrating an example system that may use the embedding space of FIG. 1 to train an object detector, according to various aspects of the present disclosure.

FIG. 2 is a block diagram illustrating an example system 200 that may use embedding space 110 of FIG. 1 to train an object detector 204, according to various aspects of the present disclosure. A trainer 202 of system 200 may train object detector 204 to detect objects in training data 206 that correspond to objects represented by embedding space 110. Object detector 204 is an example of FastCAD.

For example, training data 206 may include a colored point cloud from an RGB-D scan or a colorless point cloud sampled from the reconstructed scene mesh obtained by applying a neural reconstruction method to a RGB video. The point clouds may include representations of objects.

Trainer 202 may be, or may include, a supervised training framework configured to train object detector 204 to correlate objects representations of objects from training data 206 with corresponding objects represented in embedding space 110.

Figure 3:
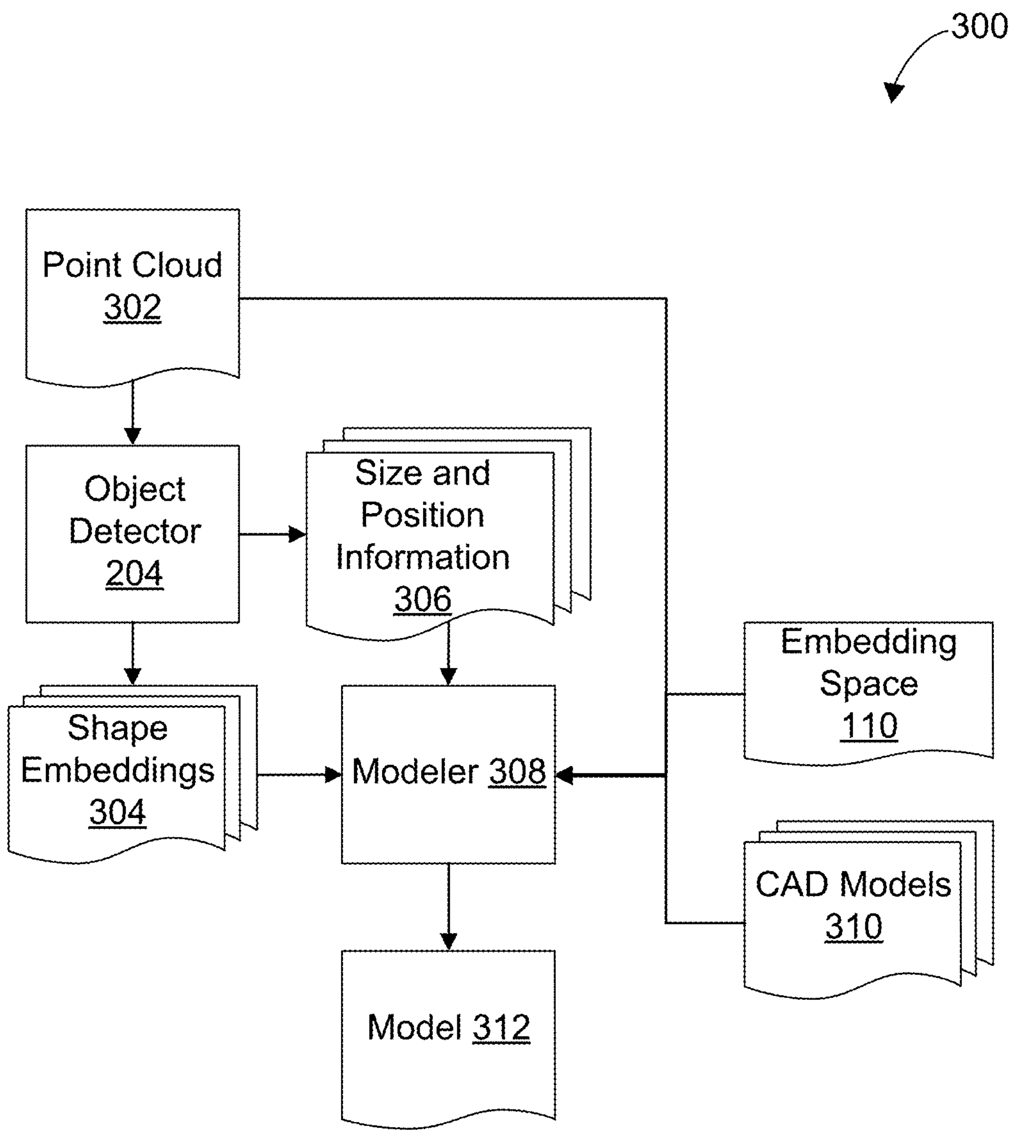
FIG. 3 is a block diagram illustrating an example system in which the object detector of FIG. 2 may generate shape embeddings based on point cloud, according to various aspects of the present disclosure.

FIG. 3 is a block diagram illustrating an example system 300 in which object detector 204 of FIG. 2 may generate shape embeddings 304 based on point cloud 302, according to various aspects of the present disclosure. Additionally, a modeler 308 (which may be referred to as a model retrieval machine-learning model) may generate a model 312 based on point cloud 302, shape embeddings 304, and embedding space 110.

Point cloud 302 may include a point-cloud representation of an environment. For example, point cloud 302 may include a colored point cloud from an RGB-D scan or a colorless point cloud sampled from the reconstructed scene mesh obtained by applying a neural. point cloud 302 may be captured in real time, for example, by an augmented reality (AR) system or a robot. The environment may include objects.

Object detector 204 may generate shape embeddings 304 based on point cloud 302. Shape embeddings 304 may include embedding vectors representative of objects represented in point cloud 302. Because object detector 204 is trained using embedding space 110 (e.g., as described with regard to FIG. 2), the embedding vectors of shape embeddings 304 may be similar to embedding vectors of embedding space 110.

In addition to generating and outputting shape embeddings 304, object detector 204 may generate size and position information 306. Size and position information 306 may be, or may include, classifications of objects represented in point cloud 302, bounding boxes describing the size and/or position of the objects relative to the environment, and/or an orientation of the objects (e.g., relating the orientation of the CAD models to the orientation of the objects in the environment). Object detector 204 may be unique among object detectors because object detector 204 may generate shape embeddings 304 (e.g., an embedding related to a CAD model) and a categorization of an orientation of the CAD model relative to the scene. The categorization of the orientation may, for example, may be, or may include, a 4-bin classification of an object heading.

Additionally or alternatively, in some aspects, trainer 202 of FIG. 2, in training object detector 204, may train object detector 204 according to a symmetry-aware loss for object heading prediction. For example, as trainer 202 trains object detector 204, trainer 202 may calculate a loss relative to orientation of the objects. The loss may be based on symmetry of the objects, for example, by the way a corresponding ground-truth (GT) is labeled. To be more specific, each object can be identified as non-symmetric, or having 2-fold, 4-fold, or complete rotational symmetry around the up-axis, where the corresponding GT label is accordingly modeled, by e.g. [1,0,0,0], [0.5,0,0.5,0], [0.25,0.25,0.25,0.25] and [0.25,0.25,0.25,0.25] respectively.

Modeler 308 may generate model 312 representative of the environment represented by point cloud 302. Model 312 may include point-cloud representations of objects based on CAD models of the objects. For example, modeler 308 may match embedding vectors of shape embeddings 304 with corresponding embedding vectors of embedding space 110. Further, modeler 308 may identify CAD models of CAD models 310 that correspond to the matching embedding vectors. Modeler 308 may insert point-cloud representations of the corresponding CAD models into point cloud 302. Point-cloud representations of CAD models may be more dense and/or more accurate than point-cloud representations captured live. For example, the point-cloud representations of CAD models 310, as inserted into model 312 may be more dense (e.g., include more points) and/or be more accurate than the point-cloud representations of the objects in point cloud 302. As such, modeler 308 may enhance point cloud 302 by adding point-cloud representations of objects based on CAD models 310 of the objects into point cloud 302.

Figure 4:
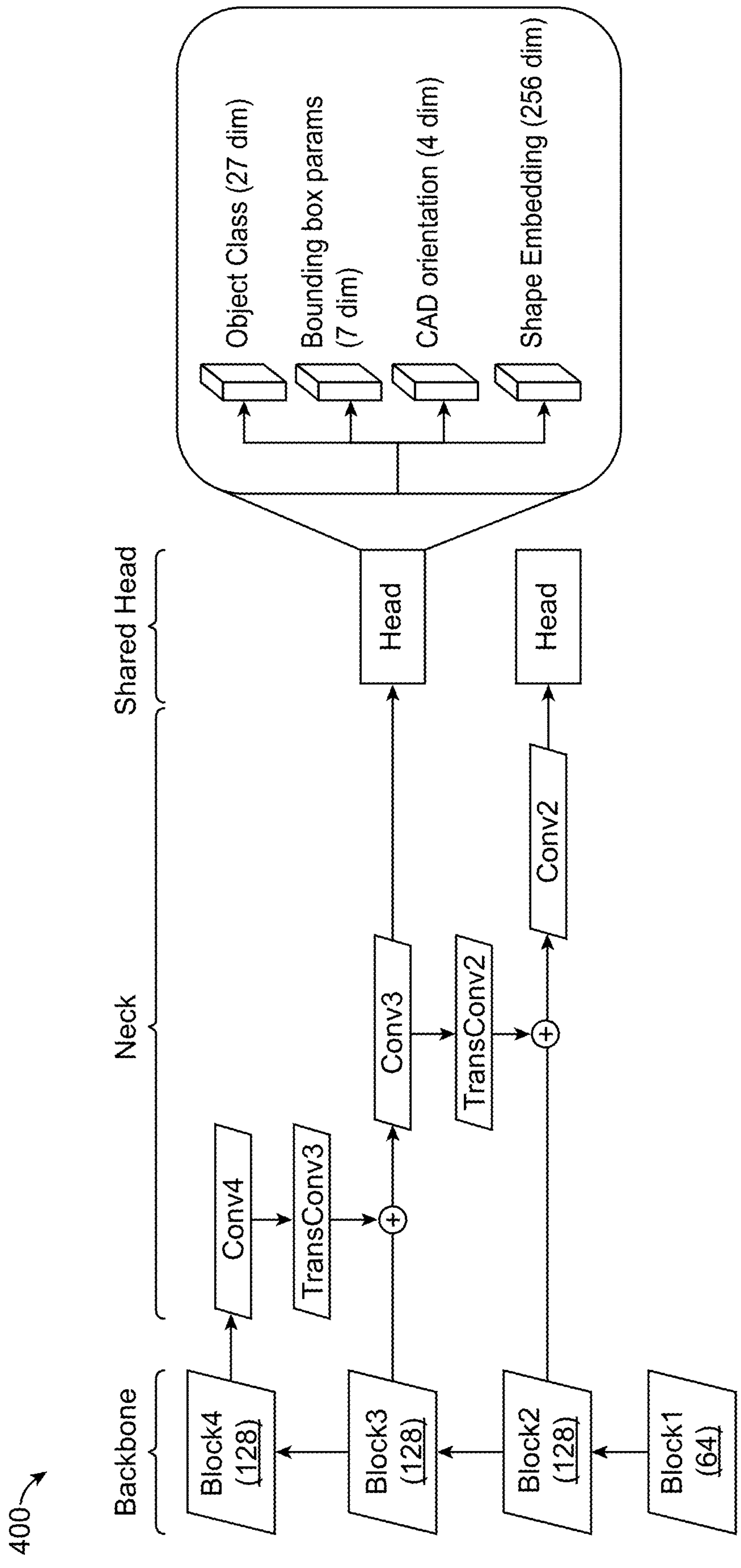
FIG. 4 is a block diagram illustrating an example system that is an example of the object detector of FIG. 2 and FIG. 3, according to various aspects of the present disclosure.

FIG. 4 is a block diagram illustrating an example system 400 that is an example of object detector 204 of FIG. 2 and FIG. 3, according to various aspects of the present disclosure. For example, system 400 is an example of FastCAD.

System 400 may take as an input a colored point cloud from an RGB-D scan or a colorless point cloud sampled from the reconstructed scene mesh obtained by applying a neural reconstruction method to a RGB video.

A backbone and neck of system 400 may include convolutional layers. A head of system 400 may generate a "shared embedding" which may be an example of shape embeddings 304 of FIG. 3 and an "object class," "bounding box parameters," and a "CAD orientation" all of which may be examples of size and position information 306 of FIG. 3.

Figure 5:
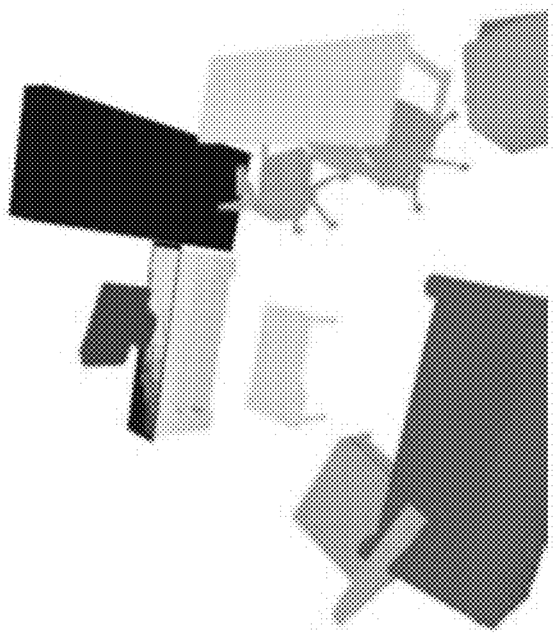
FIG. 5 includes an example colored point-cloud representation of a scene and an example representation of point-cloud representations of CAD models of objects of the scene.
Figure 5:
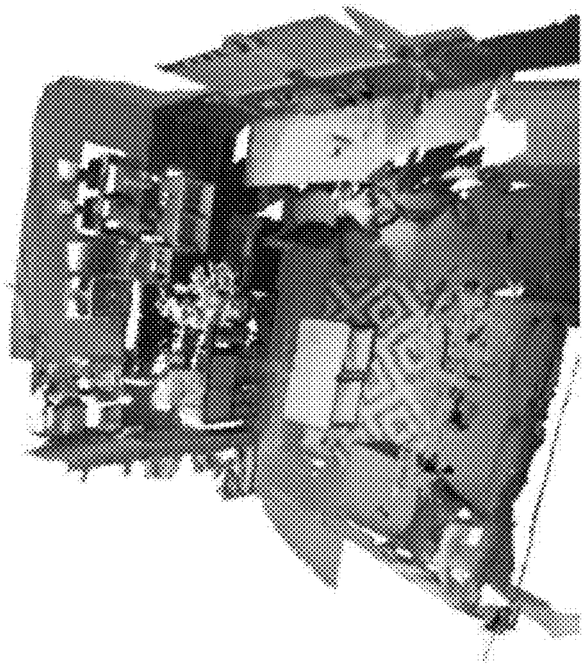

For example, FIG. 5 includes an example colored point-cloud representation of a scene (e.g., representation 502) and an example representation of point-cloud representations of CAD models of objects of the scene (e.g., representation 504). For instance, representation 502 may be an example of point cloud 302 of FIG. 3 (e.g., a point-cloud representation of a scene). Representation 504 may be a representation of point-cloud representations of CAD models of objects detected in representation 502, according to various aspects of the present disclosure. The point cloud-representations of the CAD models of the objects may be added to representation 502.

Figure 6:
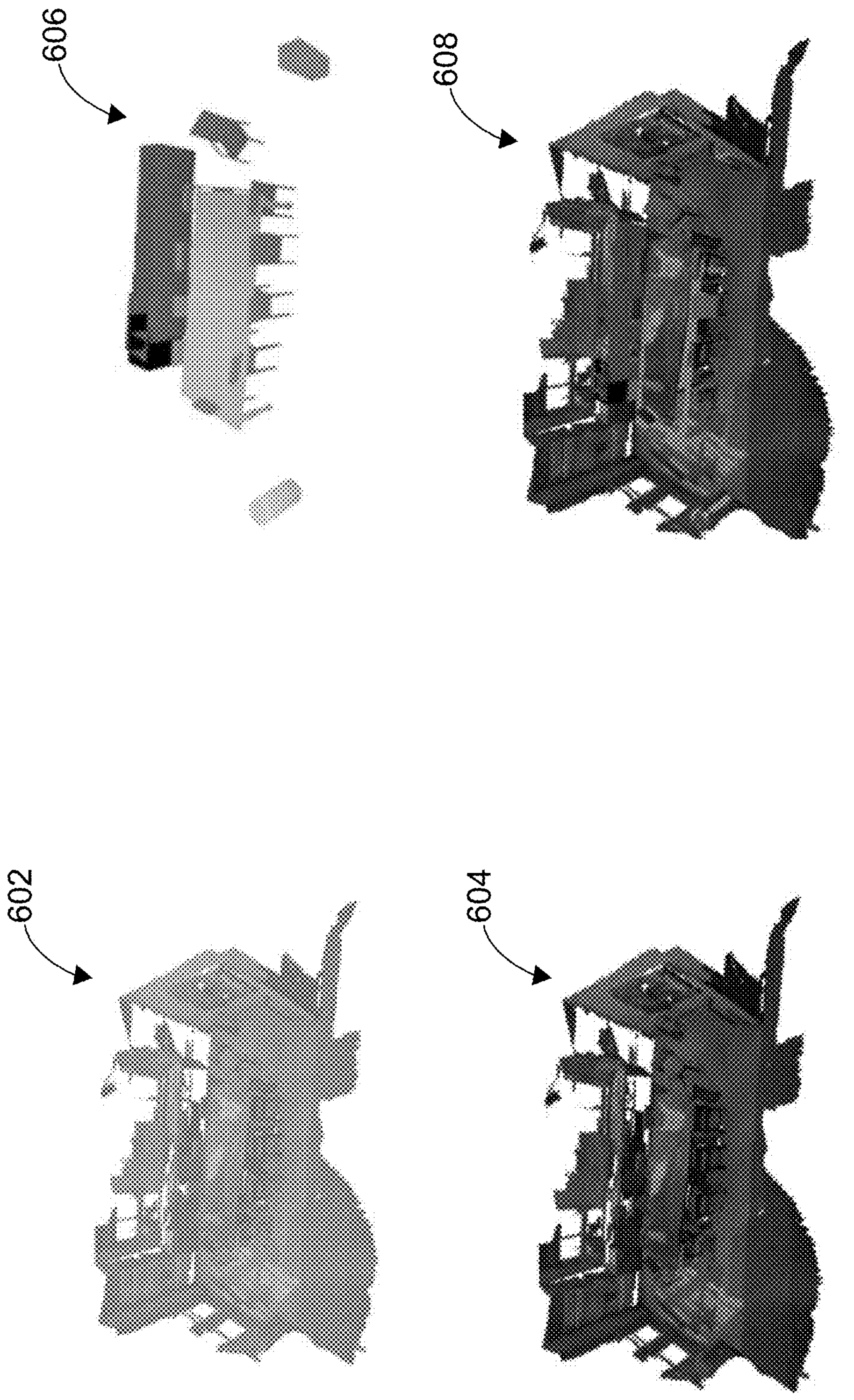
FIG. 6 includes three example representations of a scene and an example representation of objects in the scene.

As another example, FIG. 6 includes three example representations of a scene and an example representation of objects in the scene. For example, representation 602 may be a colorless point cloud sampled from a reconstructed scene mesh obtained by applying a neural reconstruction method to a RGB video of a scene. Representation 604 may be a colored point cloud from an RGB-D scan of the scene. For example, representation 602 and representation 604 may be examples of point cloud 302 of FIG. 3.

Representation 606 may be a representation of point-cloud representations of CAD models of objects detected in representation 602 or representation 604, according to various aspects of the present disclosure. Representation 608 may be representation of representation 604 with the point-cloud representations of representation 606 add into representation 604. For example, representation 608 may be an example of model 312.

Figure 7:
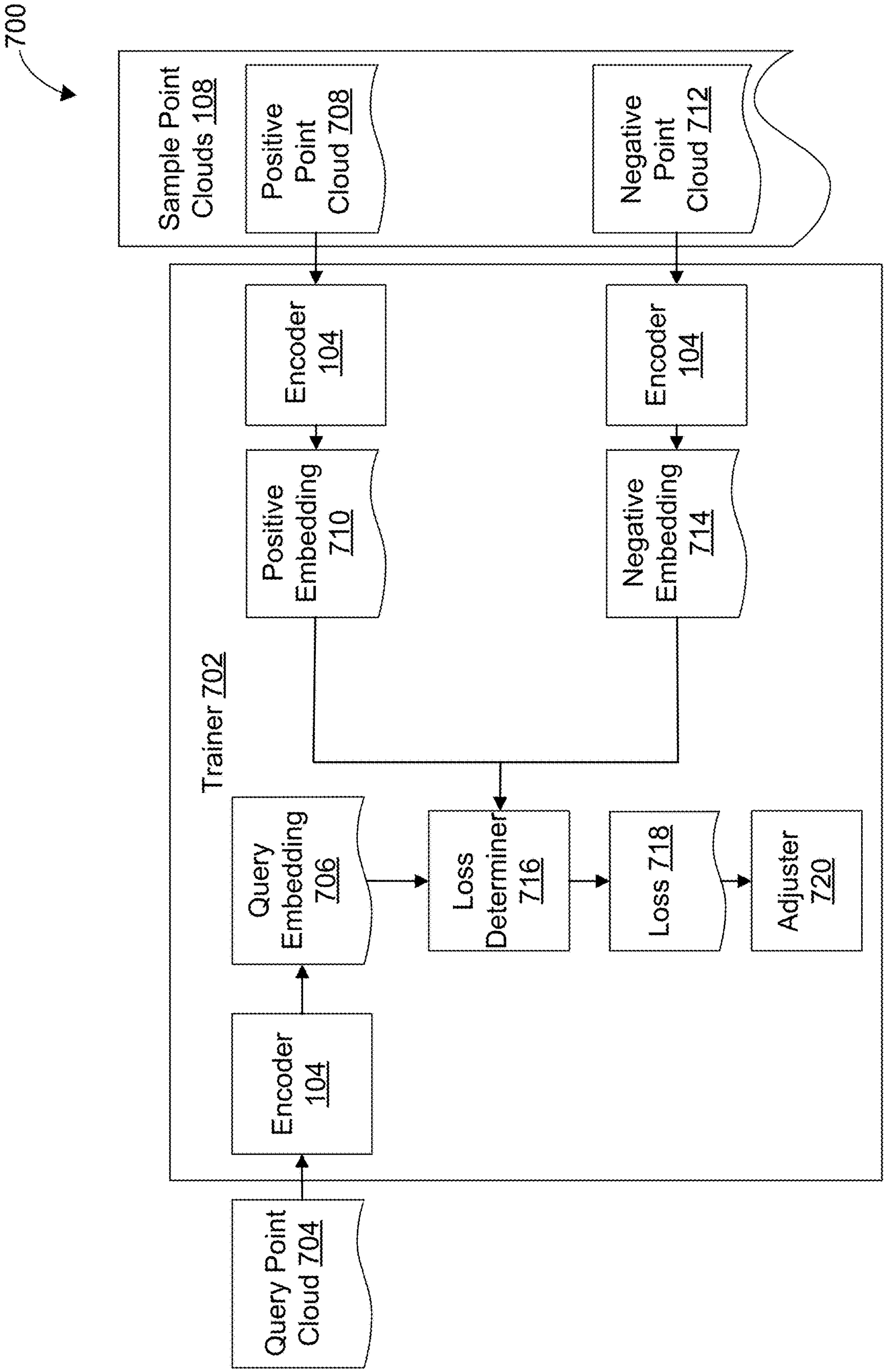
FIG. 7 is a block diagram illustrating an example system for training the encoder of FIG. 1, according to various aspects of the present disclosure.

FIG. 7 is a block diagram illustrating an example system 700 for training encoder 104 of FIG. 1, according to various aspects of the present disclosure. Trainer 702 is an example of trainer 102 of FIG. 1. Trainer 702 of system 700 may train encoder 104 according to a contrastive-learning approach.

Query point cloud 704 may be an example one of query point clouds 106 of FIG. 1. Positive point cloud 708 may be an example one of sample point clouds 108. Positive point cloud 708 may relate to query point cloud 704. For example, positive point cloud 708 and query point cloud 704 may both be based on the same object. For example, positive point cloud 708 and query point cloud 704 may both be point-cloud representations of the same object. Negative point cloud 712 may be another example one of sample point clouds 108. Negative point cloud 712 may be based on a different object than query point cloud 704 and positive point cloud 708. In general, trainer 702 may train encoder 104 to correlate query point cloud 704 with positive point cloud 708.

Figure 8:
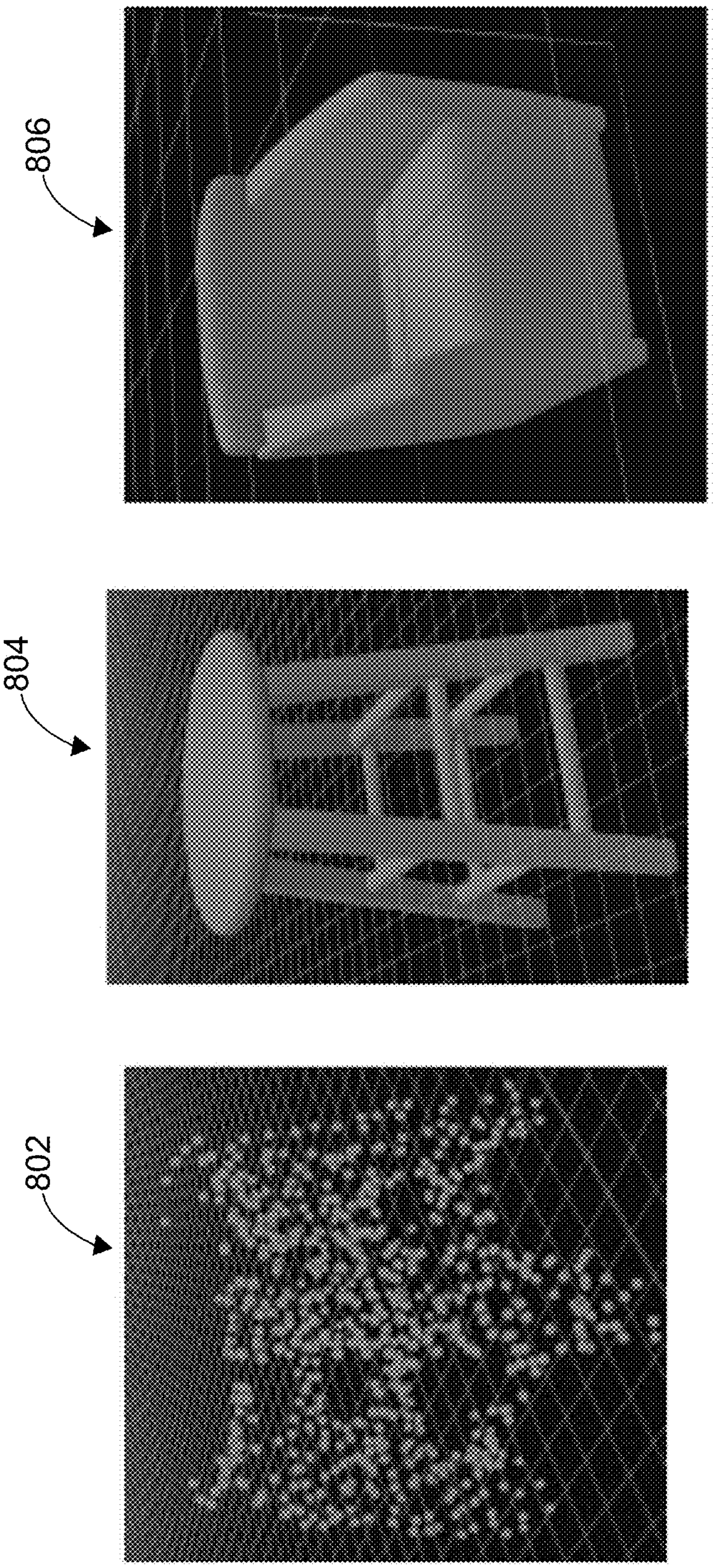
FIG. 8 includes two different point-cloud representations of an object and a point-cloud representation of another object.

For example, query point cloud 802 of FIG. 8 is an example of query point cloud 704, positive point cloud 804 of FIG. 8 is an example of positive point cloud 708, and negative point cloud 806 of FIG. 8 is an example of negative point cloud 712. Query point cloud 802 and positive point cloud 804 may represent the same object. Because positive point cloud 804 may be based on a CAD model whereas query point cloud 802 may represent a capture (e.g., RGB-D or a point cloud based on RGB video data), positive point cloud 804 may be more dense (e.g., include more points) than query point cloud 802. Further, positive point cloud 804 may include points that are occluded from the perspective from which query point cloud 802 was captured (or simulated to have been captured). For example, positive point cloud 804 may include points on a back side of the object. Additionally or alternatively, positive point cloud 804 may be more accurate than query point cloud 802. For example, query point cloud 802 may include noise (real or simulated).

Returning to FIG. 7, to train encoder 104, (e.g., in a training phase) trainer 702 may cause encoder 104 to encode query point cloud 704 to generate query embedding 706. Encoder 104 may be nascent during the training phase. As such, initially, query embedding 706 may not be useful (e.g., apparently random). However, over iterations of the training process, encoder 104 may be adjusted such that query embedding 706 becomes more useful. Additionally, trainer 702 may additionally cause encoder 104 to generate positive embedding 710 based on positive point cloud 708 and negative embedding 714 based on negative point cloud 712.

Loss determiner 716 may compare query embedding 706 to positive embedding 710 and to negative embedding 714.

Because query point cloud 704 and positive point cloud 708 are based on the same object (though not the same), query embedding 706 should be more like positive embedding 710 than query embedding 706 is to negative embedding 714. Loss determiner 716 may determine a loss 718 (e.g., a triplet loss) based on the comparison between query embedding 706 and positive embedding 710 and between query embedding 706 and negative embedding 714.

For example, loss 718 may be described by $$L = \max\left(0,\ d^2(A, P) + m - d^2(A, N)\right)$$

where A represents query embedding 706,
where P represents positive embedding 710,
where N represents negative embedding 714, and
where d(A, B) denotes the L2 distance between vector A and B.

This loss ensures that the distance between the anchor and the positive example is smaller by a margin m than the distance between the anchor and the negative.

Adjuster 720 may adjust parameters (e.g., weights) of encoder 104 such that in further iterations of the training process (e.g., using different ones of query point clouds 106 and sample point clouds 108), encoder 104 causes query embedding 706 to be more like positive embedding 710 than query embedding 706 is to negative embedding 714.

Sample point clouds 108 may be curated to provide prior distribution into negative sampling. For example, while training encoder 104, positive point cloud 708 and/or negative point cloud 712 may be selected instances of sample point clouds 108 that will be provided for effectively training encoder 104. Some of sample point clouds 108 are more similar to query point cloud 704 than others of sample point clouds 108. While training encoder 104, a ratio of similar and dissimilar ones of sample point clouds 108 will be used as negative point cloud 712. More specifically, the negative pairs are not uniformly sampled but are rather sampled with their non-uniform distribution of appearance in the training data.

In FIG. 7, encoder 104 is illustrated as three separate instances. In some aspects, encoder 104 may be separate instances of the same encoder, all adjusted by adjuster 720 and kept the same. In other aspects, trainer 702 may include a single encoder 104 which may be used with separate inputs (e.g., query point cloud 704, positive point cloud 708, and negative point cloud 712) to generate separate outputs (e.g., query embedding 706, positive embedding 710, and negative embedding 714).

Figure 9:
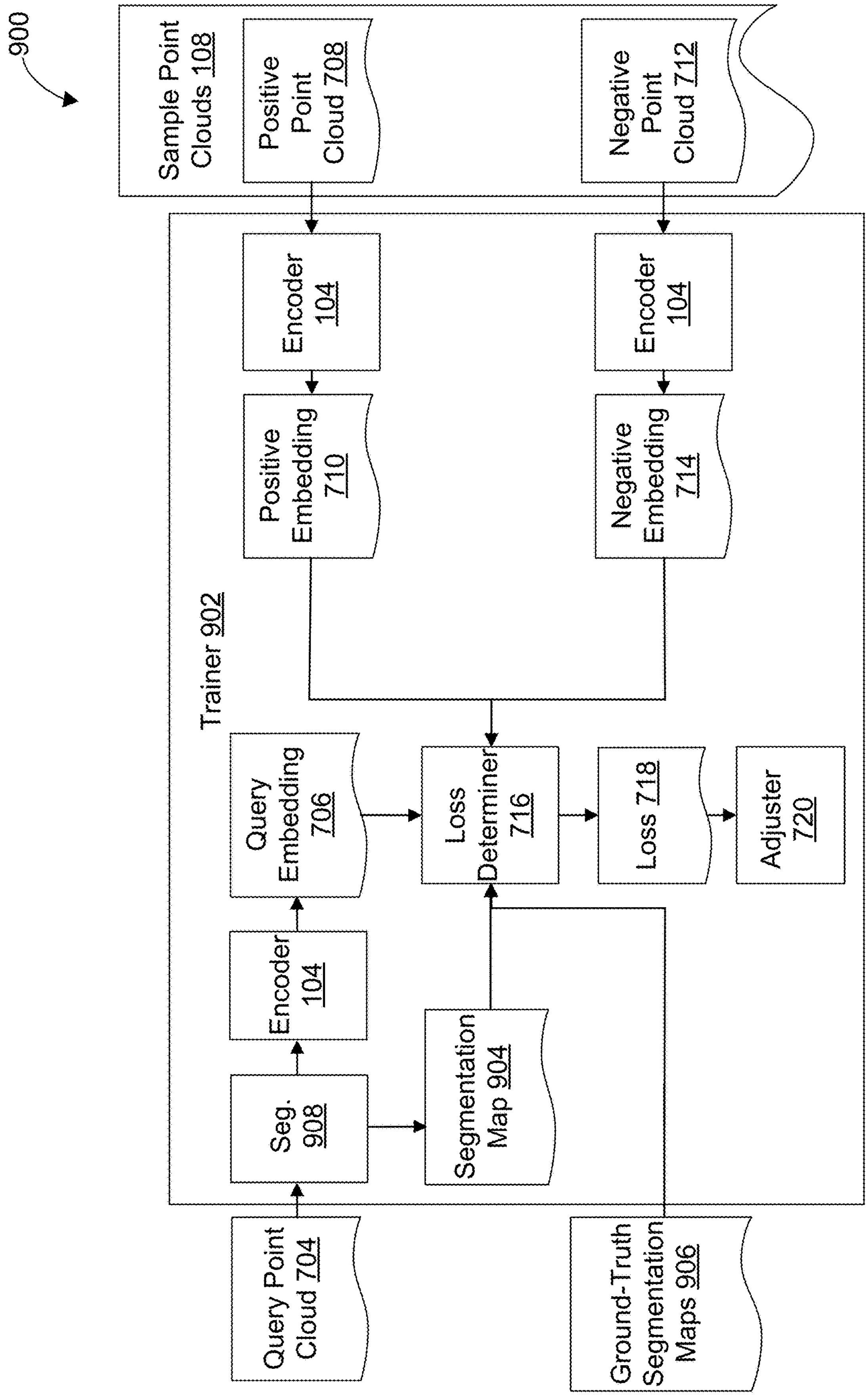
FIG. 9 is a block diagram illustrating another example system for training the encoder of FIG. 1, according to various aspects of the present disclosure.

FIG. 9 is a block diagram illustrating an example system 900 for training encoder 104 of FIG. 1, according to various aspects of the present disclosure. Trainer 902 is an example of trainer 102 of FIG. 1. Trainer 902 of system 900 may train encoder 104 according to a contrastive-learning approach that is substantially similar to the approach described with regard to trainer 702 of FIG. 7.

Additionally, trainer 902 may perform a first auxiliary task—segmenting query point cloud 704 to generate segmentation map 904. For example, trainer 902 may include a segmenter 908 (e.g., "seg. 908") that may segment query point cloud 704 into foreground points and background points. Segmenter 908 may be, for example, a multi-layer perceptron (MLP). Segmenter 908 may be relatively thin, including, for example, five or fewer layers. Segmentation map 904 may be an indication of the segmentation.

Trainer 902 may implement a supervised-learning approach to train segmenter 908 to better segment query point cloud 704. For example, loss determiner 716 may compare a generated segmentation map 904 to a corresponding ground-truth segmentation maps 906. Loss determiner 716 may determine loss 718 (e.g., a Binary Cross Entropy loss) based on differences between segmentation map 904 and ground-truth segmentation maps 906 and adjuster 720 may adjust segmenter 908 to cause segmentation map 904 generated by segmenter 908 to be more like ground-truth segmentation maps 906 in further iterations of the training process.

Additionally or alternatively, while trainer 902 is training encoder 104, segmenter 908 may generate segmentation map 904. Loss determiner 716 may determine loss 718 based on a difference between segmentation map 904 and ground-truth segmentation maps 906. Further, in some aspects, adjuster 720 may adjust encoder 104 based on loss 718 which is based on differences between segmentation map 904 and ground-truth segmentation maps 906.

Training segmenter 908 to segment query point cloud 704, and/or training encoder 104 based on segmentation of query point cloud 704, may improve encoder 104. For example, while trainer 902 is training encoder 104, trainer 902 may backpropagate losses from segmenter 908 to use in the training of encoder 104. Improving encoder 104 may result in improvements to embedding space 110 (e.g., as generated by encoder 104 as described with regards to FIG. 1). Improving embedding space 110 may result in improvements to the machine-learning model (e.g., object detector 204 of FIG. 2) which is trained using embedding space 110 as described with regard to FIG. 2. Improvements to object detector 204 may result in improvements to the quality of shapes (e.g., shape embeddings 304 of FIG. 3) as generated by object detector 204 (e.g., as described with regard to FIG. 2.

Figure 10:
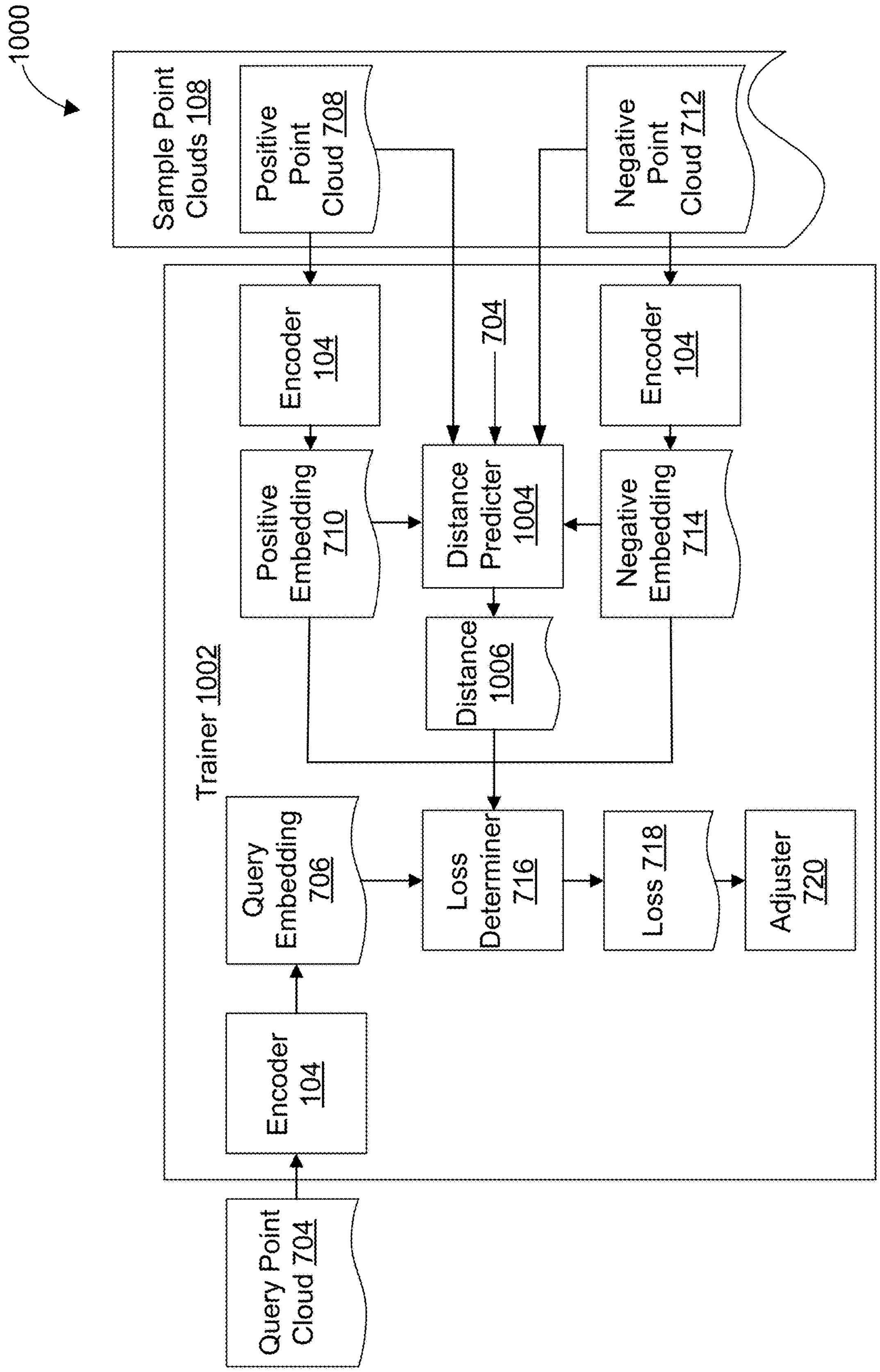
FIG. 10 is a block diagram illustrating another example system for training the encoder of FIG. 1, according to various aspects of the present disclosure.

FIG. 10 is a block diagram illustrating an example system 1000 for training encoder 104 of FIG. 1, according to various aspects of the present disclosure. Trainer 1002 is an example of trainer 102 of FIG. 1. Trainer 1002 of system 1000 may train encoder 104 according to a contrastive-learning approach that is substantially similar to the approach described with regard to trainer 702 of FIG. 7.

Additionally, trainer 1002 may perform a second auxiliary task—predicting a distance 1006 (e.g., a Chamfer distance) based on positive embedding 710 and negative embedding 714. For example, trainer 1002 may train a distance predicter 1004 (e.g., a machine-learning model, such as a multi-later perceptron (MLP)) to predict distance 1006. Distance predicter 1004 may to regress the Chamfer distance between a geometry of positive embedding 710 and a geometry of negative embedding 714. The intuition behind introducing this is that in some cases, negative point cloud 712 can be similar to positive point cloud 708, while at other times negative point cloud 712 may be very different from positive point cloud 708. Making the encoder 104 to learn embeddings containing such information is helpful for learning more useful embeddings in general as it enables the model to distinguish similar and dissimilar negative samples.

For example, distance predicter 1004 may be trained through an iterative training process to predict distance 1006. For example, trainer 1002 may receive a ground-truth distance (e.g., a ground-truth Chamfer distance between the CAD models on which positive point cloud 708 and negative point cloud 712 are based). Trainer 1002 may cause distance predicter 1004 to predict distance 1006 based on positive embedding 710 and negative embedding 714. A loss may be determined based on the difference between the predicted distance (e.g., distance 1006) and the ground-truth distance. Distance predicter 1004 may be adjusted based on the loss.

Additionally or alternatively, while trainer 1002 is training encoder 104, distance predicter 1004 may generate distance 1006. Loss determiner 716 may determine loss 718 based on distance 1006 (e.g., in addition to determining loss 718 based on query embedding 706, positive embedding 710, and negative embedding 714). Further, adjuster 720 may adjust parameters (e.g., weights) of encoder 104 based on loss 718 based on distance 1006.

Training encoder 104 based on distance 1006, for example, backpropagating losses from distance predicter 1004, may improve encoder 104. Improving encoder 104 may result in improvements to embedding space 110 (e.g., as generated by encoder 104 as described with regards to FIG. 1). Improving embedding space 110 may result in improvements to the machine-learning model (e.g., object detector 204 of FIG. 2) which is trained using embedding space 110 as described with regard to FIG. 2. Improvements to object detector 204 may result in improvements to the quality of shapes (e.g., shape embeddings 304 of FIG. 3) as generated by object detector 204 (e.g., as described with regard to FIG. 2.

Figure 11:
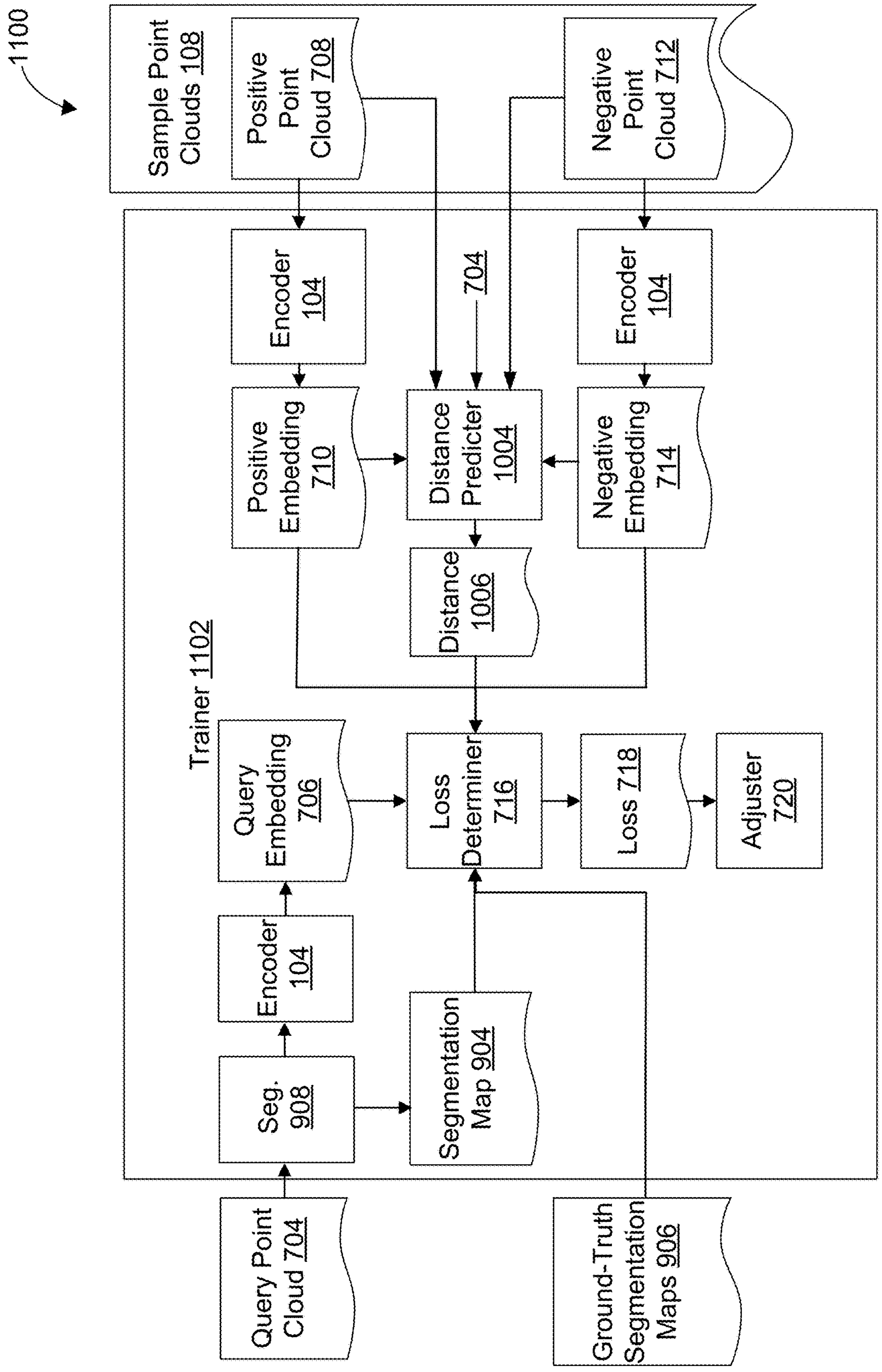
FIG. 11 is a block diagram illustrating another example system for training the encoder of FIG. 1, according to various aspects of the present disclosure.

FIG. 11 is a block diagram illustrating an example system 1100 for training encoder 104 of FIG. 1, according to various aspects of the present disclosure. Trainer 1102 is an example of trainer 102 of FIG. 1. Trainer 1102 of system 1100 may train encoder 104 according to a contrastive-learning approach that is substantially similar to the approach described with regard to trainer 702 of FIG. 7. Additionally, trainer 1102 may perform the first auxiliary task—generating segmentation map 904 based on query point cloud 704 (e.g., as described with regard to segmenter 908 of FIG. 9) and perform the second auxiliary task—predicting distance 1006 (e.g., as described with regard to distance predicter 1004 of FIG. 10).

Figure 12:
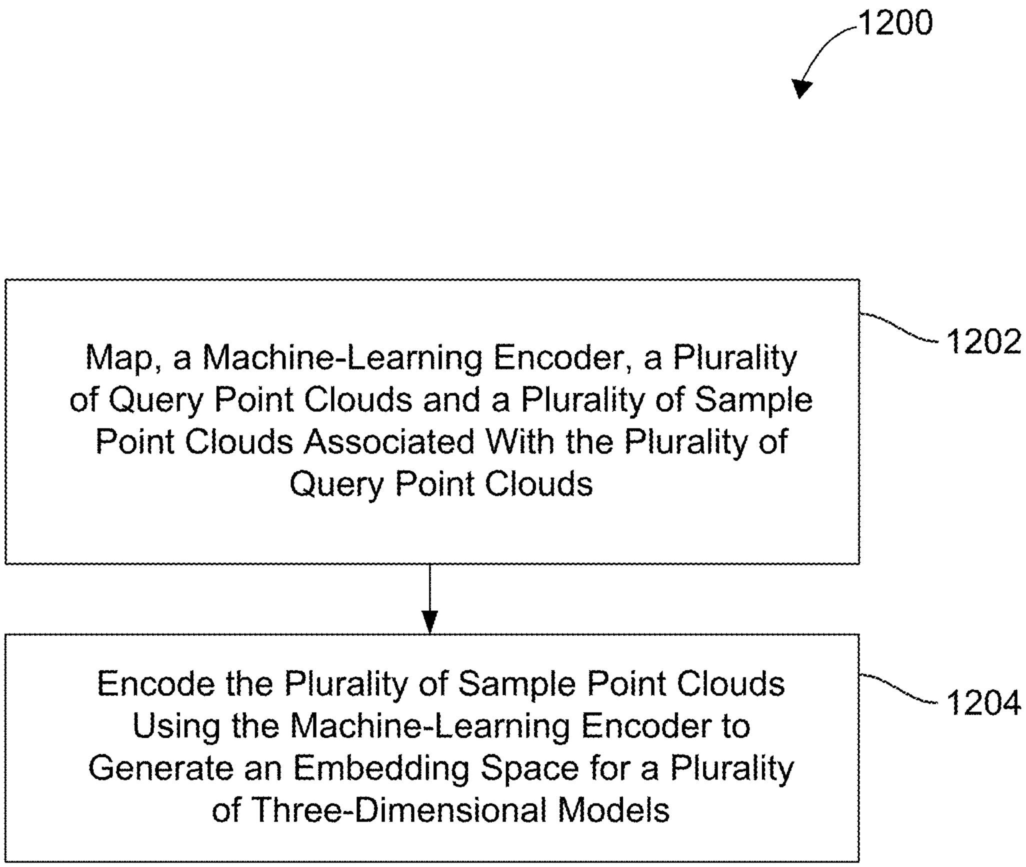
FIG. 12 is a flow diagram illustrating an example process for generating embedding vectors, in accordance with aspects of the present disclosure.

FIG. 12 is a flow diagram illustrating a process 1200 for generating embedding vectors, in accordance with aspects of the present disclosure. One or more operations of process 1200 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 1200. The one or more operations of process 1200 may be implemented as software components that are executed and run on one or more processors.

At block 1202, a computing device (or one or more components thereof) may map, using a machine-learning encoder, a plurality of query point clouds and a plurality of sample point clouds associated with the plurality of query point clouds. For example, trainer 102 of FIG. 1 may train encoder 104 of FIG. 1 based on query point clouds 106 and sample point clouds 108. As another example, trainer 702 of FIG. 7 may train encoder 104 based on a query point cloud 704 (e.g., one of query point clouds 108) and sample point clouds 108. As another example, trainer 902 of FIG. 9 may train encoder 104 based on a query point cloud 704 (e.g., one of query point clouds 108) and sample point clouds 108. As another example, trainer 1002 of FIG. 10 may train encoder 104 based on a query point cloud 704 (e.g., one of query point clouds 108) and sample point clouds 108. As another example, trainer 1102 of FIG. 11 may train encoder 104 based on a query point cloud 704 (e.g., one of query point clouds 108) and sample point clouds 108.

In some aspects, in the embedding space, geometrically similar objects may be represented by similar embedding vectors and geometrically dissimilar objects may be represented by dissimilar embedding vectors.

In some aspects, to map the plurality of query point clouds and the plurality of sample point clouds, the computing device (or one or more components thereof) may train, using contrastive learning, the machine-learning encoder based on the plurality of query point clouds and the plurality of sample point clouds. For example, trainer 102 of FIG. 1 may train encoder 104 of FIG. 1, using contrastive learning based on query point clouds 106 and sample point clouds 108. As another example, trainer 702 of FIG. 7 may train encoder 104 based on a query point cloud 704 (e.g., one of query point clouds 108) and sample point clouds 108. As another example, trainer 902 of FIG. 9 may train encoder 104 based on a query point cloud 704 (e.g., one of query point clouds 108) and sample point clouds 108. As another example, trainer 1002 of FIG. 10 may train encoder 104 based on a query point cloud 704 (e.g., one of query point clouds 108) and sample point clouds 108. As another example, trainer 1102 of FIG. 11 may train encoder 104 based on a query point cloud 704 (e.g., one of query point clouds 108) and sample point clouds 108.

In some aspects, each sample point cloud of the plurality of sample point clouds may be based on a respective model of an object. For example, sample point clouds 108 may be, or may include, point clouds based on respective models of multiple (e.g., dozens or hundreds or more) of objects.

In some aspects, each query point cloud of the plurality of query point clouds may be based on a respective simulated point-cloud capture of an object. For example, query point clouds 106 may be, or may include, simulated point-cloud captures of multiple (e.g., dozens or hundreds or more) of objects.

In some aspects, the objects of the point cloud models of the sample point clouds may correspond to the objects of the simulated point-cloud captures of the query point clouds. For example, query point clouds 106 and sample point clouds 108 may be based on the same objects.

In some aspects, the computing device (or one or more components thereof) may train a machine-learning segmenter to segment point clouds representative of scenes into object points and background points. For example, trainer 902 of FIG. 9 may train segmenter 908 of FIG. 9 to segment query point cloud 704 to generate segmentation map 904.

In some aspects, to train the machine-learning segmenter to segment point clouds representative of scenes, the computing device (or one or more components thereof) may: cause the machine-learning segmenter to output a segmentation map for a query point cloud of the plurality of query point clouds; determine a segmentation loss based on a difference between the segmentation map and a ground-truth segmentation map corresponding to the query point cloud; and modify parameters of the machine-learning segmenter based on the segmentation loss. For example, to train segmenter 908, trainer 902 may cause segmenter 908 to generate segmentation map 904 based on query point cloud 704. Trainer 902 may further cause loss determiner 716 to determine loss 718 based on a difference between segmentation map 904 and a corresponding ground-truth segmentation map 906. Further trainer 902 may cause adjuster 720 to modify segmenter 908 based on loss 718.

In some aspects, to train the machine-learning encoder, the computing device (or one or more components thereof) may train the machine-learning encoder based on a segmentation loss determined based on query point clouds of the plurality of query point clouds. For example, to train encoder 104, trainer 902 may use segmenter 908 to generate segmentation map 904, calculate a segmentation loss (e.g., loss 718) based on a difference between segmentation map 904 and a corresponding ground-truth segmentation map 906, and modify encoder 104 based on the segmentation loss.

In some aspects, to train the machine-learning encoder, the computing device (or one or more components thereof) may: cause a machine-learning segmenter to output a segmentation map for a query point cloud of the plurality of query point clouds; and determine a segmentation loss based on a difference between the segmentation map and a ground-truth segmentation map corresponding to the query point cloud; and modify parameters of the machine-learning encoder based on the segmentation loss. For example, to train encoder 104, trainer 902 may use segmenter 908 to generate segmentation map 904. Loss determiner 716 of trainer 902 may calculate a segmentation loss (e.g., loss 718) based on a difference between segmentation map 904 and a corresponding ground-truth segmentation map 906. Adjuster 720 may modify encoder 104 based on the segmentation loss.

In some aspects, the computing device (or one or more components thereof) may train a machine-learning distance predicter to predict distances between query point clouds of the plurality of query point clouds and sample point clouds of the plurality of sample point clouds. For example, trainer 1002 of FIG. 10 may train distance predicter 1004 to predict distance 1006 between query point cloud 704 and sample point clouds 108.

In some aspects, to train the machine-learning distance predicter, the computing device (or one or more components thereof) may determine a positive difference between a query point cloud of the plurality of query point clouds and a positive point cloud of the plurality of sample point clouds; determine a negative difference between the query point cloud and a negative point cloud of the plurality of sample point clouds; determine a loss based on the positive difference and the negative difference; and modifying parameters of the machine-learning distance predicter based on the loss. For example, distance predicter 1004 may determine a positive difference between query point cloud 704 and positive point cloud 708. Further, distance predicter 1004 may determine a negative difference between query point cloud 704 and negative point cloud 712. Loss determiner 716 may determine loss 718 based on the positive difference and the negative difference. Adjuster 720 may modify distance predicter 1004 based on loss 718.

In some aspects, the positive difference comprises a Chamfer distance between the query point cloud and the positive point cloud; and the negative difference comprises a Chamfer distance between the query point cloud and the negative point cloud.

In some aspects, to train the machine-learning encoder, the computing device (or one or more components thereof) may train the machine-learning encoder based on differences between query point clouds of the plurality of query point clouds and sample point clouds of the plurality of sample point clouds. For example, distance predicter 1004 may determine a positive difference between query point cloud 704 and positive point cloud 708. Further, distance predicter 1004 may determine a negative difference between query point cloud 704 and negative point cloud 712. Loss determiner 716 may determine loss 718 based on the positive difference and the negative difference. Adjuster 720 may modify encoder 104 based on loss 718.

In some aspects, the differences between query point clouds of the plurality of query point clouds and sample point clouds of the plurality of sample point clouds comprise Chamfer distances between query point clouds of the plurality of query point clouds and sample point clouds of the plurality of sample point clouds.

In some aspects, to train the machine-learning encoder, the computing device (or one or more components thereof) may: determine a positive difference between a query point cloud of the plurality of query point clouds and a positive point cloud of the plurality of sample point clouds; determine a negative difference between the query point cloud and a negative point cloud of the plurality of sample point clouds; determine a loss based on the positive difference and the negative difference; and modify parameters of the machine-learning encoder based on the loss. For example, distance predicter 1004 may determine a positive difference between query point cloud 704 and positive point cloud 708. Further, distance predicter 1004 may determine a negative difference between query point cloud 704 and negative point cloud 712. Loss determiner 716 may determine loss 718 based on the positive difference and the negative difference. Adjuster 720 may modify encoder 104 based on loss 718.

In some aspects, the positive difference comprises a Chamfer distance between the query point cloud and the positive point cloud; and the negative difference comprises a Chamfer distance between the query point cloud and the negative point cloud.

In some aspects, to train the machine-learning encoder, the computing device (or one or more components thereof) may train the machine-learning encoder based on Chamfer distances differences between sample point clouds of the plurality of sample point clouds. For example, trainer 1002 may train encoder 104 based on differences between positive point cloud 708 and negative point cloud 712.

At block 1204, the computing device (or one or more components thereof) may encode the plurality of sample point clouds using the machine-learning encoder to generate an embedding space for a plurality of three-dimensional models. For example, encoder 104 may generate embedding space 110 based on sample point clouds 108.

In some aspects, the computing device (or one or more components thereof) may train a machine-learning model using the embedding space. For example, trainer 202 of FIG. 2 may train object detector 204 of FIG. 2 using embedding space 110.

In some aspects, the machine-learning model may be trained to regress the embedding space. For example, object detector 204 may regress embedding space 110.

In some aspects, the machine-learning model is trained to identify one or more objects in a scene based on a point cloud representative of the scene; and generate one or more respective shape embeddings for the one or more objects. For example, object detector 204 may be trained to identify objects in point clouds (e.g., Shape embeddings 304 of FIG. 3) and generate shape embeddings based on the objects (e.g., shape embeddings 304 of FIG. 3).

In some aspects, the computing device (or one or more components thereof) may generate, using a machine-learning model, based on a point cloud representative of a scene, a shape embedding representative of an object in the scene;

compare the shape embedding to shape embeddings of the embedding space to determine a matching shape embedding of the embedding space; and correlate the object with a model based on a relationship between the model and the matching shape embedding. For example, trainer 202 may train object detector 204 based on embedding space 110. Further, system 300 of FIG. 3 may provide point cloud 302 to object detector 204 and object detector 204 may generate a shape embedding 304 for an object in the scene based on point cloud 302. Modeler 308 of FIG. 3 may match the shape embedding 304 of the object with a shape embedding of embedding space 110. Further modeler 308 may correlate a model of CAD models 310 with the object based on the relationship between the shape embedding 304 of the object and the shape embedding of embedding space 110 that corresponds to the model of CAD models 310.

In some aspects, the computing device (or one or more components thereof) may model the scene using the model. For example, modeler 308 may model the scene including the model of the object.

In some aspects, the computing device (or one or more components thereof) may generate, using the machine-learning model, based on the point cloud representative of the scene, a bounding box indicative of a position of the object in the scene, and an indication of an orientation of the object. For example, the computing device (or one or more components thereof), using system 400, may generate "bounding box parameters," and a "CAD orientation" which may be examples of size and position information 306 of FIG. 3.

Figure 13:
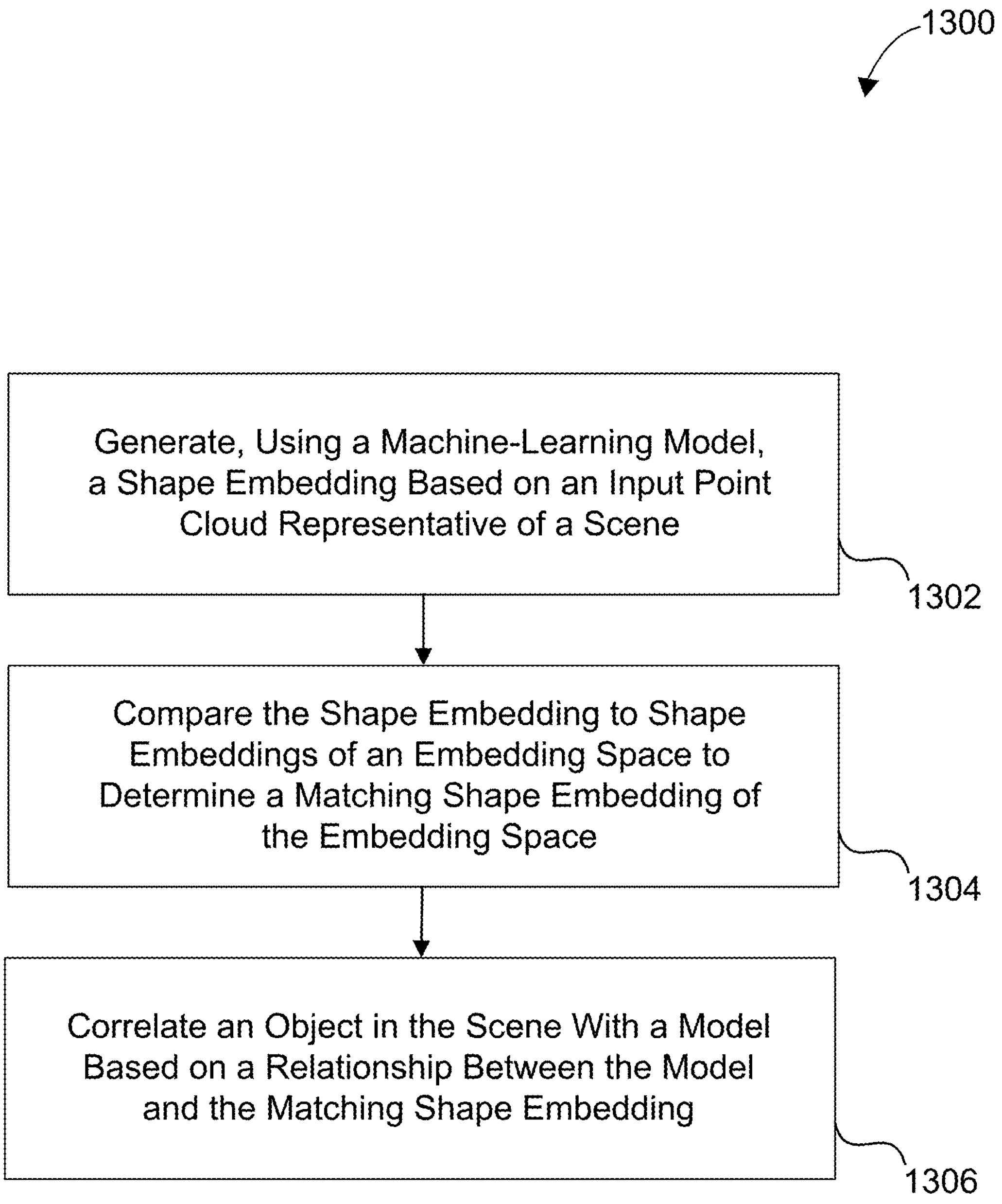
FIG. 13 is a flow diagram illustrating another example process for generating embedding vectors, in accordance with aspects of the present disclosure.

FIG. 13 is a flow diagram illustrating a process 1300 for generating embedding vectors, in accordance with aspects of the present disclosure. One or more operations of process 1300 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 1300. The one or more operations of process 1300 may be implemented as software components that are executed and run on one or more processors.

At block 1302, a computing device (or one or more components thereof) may generate, using a machine-learning model, a shape embedding based on an input point cloud representative of a scene. For example, trainer 202 of FIG. 2 may train object detector 204 based on embedding space 110. Further, system 300 of FIG. 3 may provide point cloud 302 to object detector 204 and object detector 204 may generate a shape embedding 304 for an object in the scene based on point cloud 302.

In some aspects, in the embedding space, geometrically similar objects may be represented by similar embedding vectors and geometrically dissimilar objects may be represented by dissimilar embedding vectors.

In some aspects, the embedding space is determined by an encoder trained through contrastive learning, based on a plurality of query point clouds and a plurality of sample point clouds associated with the plurality of query point clouds. For example, trainer 102 of FIG. 1 may train encoder 104 of FIG. 1, using contrastive learning based on query point clouds 106 and sample point clouds 108. As another example, trainer 702 of FIG. 7 may train encoder 104 based on a query point cloud 704 (e.g., one of query point clouds 108) and sample point clouds 108. As another example, trainer 902 of FIG. 9 may train encoder 104 based on a query point cloud 704 (e.g., one of query point clouds 108) and sample point clouds 108. As another example, trainer 1002 of FIG. 10 may train encoder 104 based on a query point cloud 704 (e.g., one of query point clouds 108) and sample point clouds 108. As another example, trainer 1102 of FIG. 11 may train encoder 104 based on a query point cloud 704 (e.g., one of query point clouds 108) and sample point clouds 108.

At block 1304, the computing device (or one or more components thereof) may compare the shape embedding to shape embeddings of an embedding space to determine a matching shape embedding of the embedding space. For example, modeler 308 of FIG. 3 may match the shape embedding 304 of the object with a shape embedding of embedding space 110.

At block 1306, the computing device (or one or more components thereof) may correlate an object in the scene with a model based on a relationship between the model and the matching shape embedding. For example, modeler 308 may correlate a model of CAD models 310 with the object based on the relationship between the shape embedding 304 of the object and the shape embedding of embedding space 110 that corresponds to the model of CAD models 310.

In some aspects, the at least one processor is configured to model the scene using the model. For example, modeler 308 may model the scene including the model of the object.

In some aspects, the computing device (or one or more components thereof) may generate, using the machine-learning model, based on the input point cloud representative of the scene, a bounding box indicative of a position of the object in the scene, and an indication of an orientation of the object. For example, the computing device (or one or more components thereof), using system 400, may generate "bounding box parameters," and a "CAD orientation" which may be examples of size and position information 306 of FIG. 3.

In some examples, as noted previously, the methods described herein (e.g., process 1200 of FIG. 12, process 1300 of FIG. 13 and/or other methods described herein) can be performed, in whole or in part, by a computing device or apparatus. In one example, one or more of the methods can be performed by system 100 of FIG. 1, trainer 102 of FIG. 1, encoder 104 of FIG. 1, trainer 702 of FIG. 7, trainer 902 of FIG. 9, trainer 1002 of FIG. 10, trainer 1102 of FIG. 11, or by another system or device. In another example, one or more of the methods (e.g., process 1200, process 1300, and/or other methods described herein) can be performed, in whole or in part, by the computing-device architecture 1600 shown in FIG. 16. For instance, a computing device with the computing-device architecture 1600 shown in FIG. 16 can include, or be included in, the components of the system 100, trainer 102, encoder 104, trainer 702, trainer 902, trainer 1002, and/or trainer 1102, and can implement the operations of process 1200, process 1300, and/or other process described herein. In some cases, the computing device or apparatus can include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device can include a display, a network interface configured to communicate and/or receive the data, any combination thereof, and/or other component(s). The network interface can be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 1200, process 1300, and/or other process described herein are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 1200, process 1300, and/or other process described herein can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a computer-readable or machine-readable storage medium, for example, in the form of a computer program comprising a plurality of instructions executable by one or more processors. The computer-readable or machine-readable storage medium can be non-transitory.

As noted above, various aspects of the present disclosure can use machine-learning models or systems.

Figure 14:
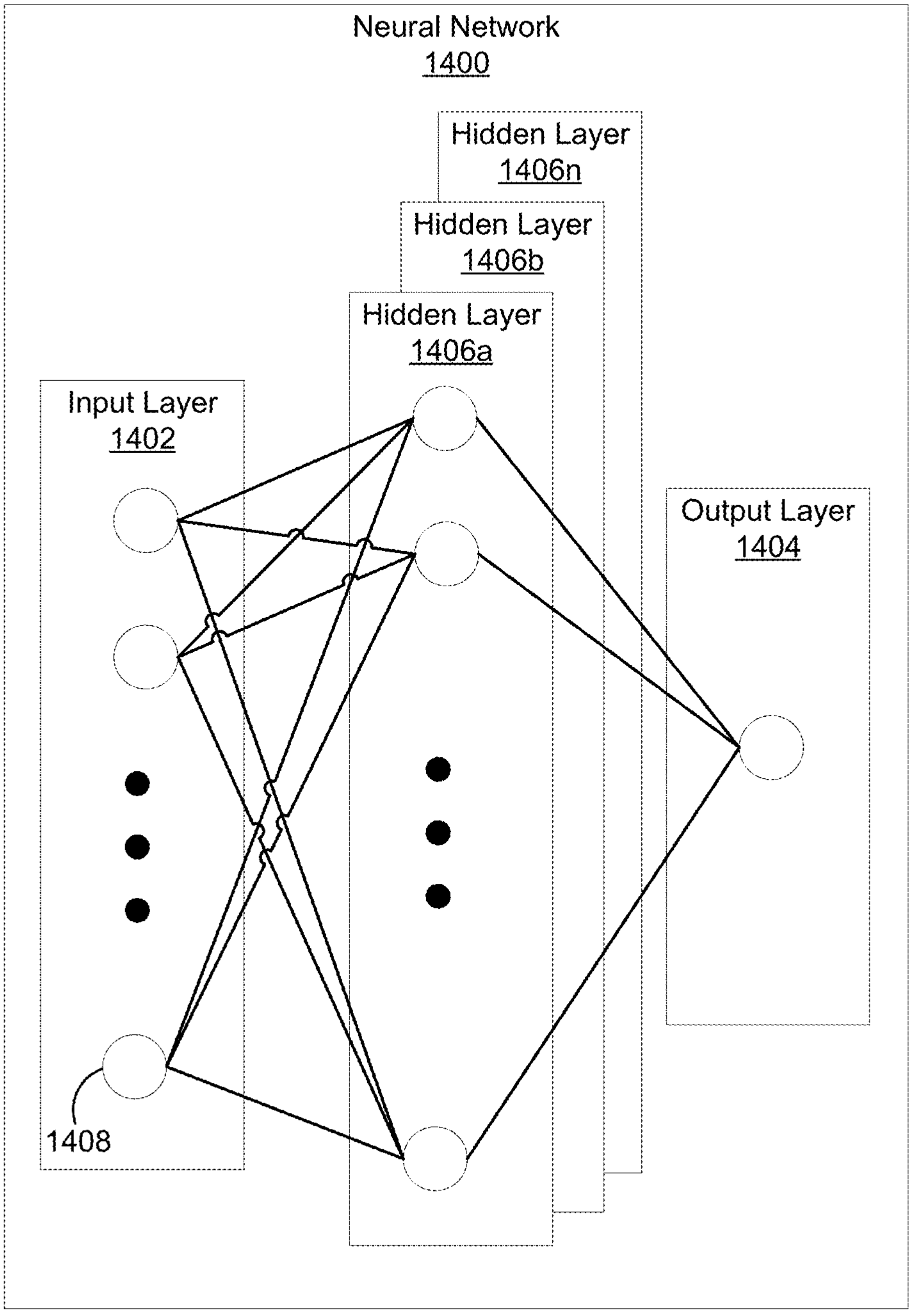
FIG. 14 is a block diagram illustrating an example of a deep learning neural network that can be used to perform various tasks, according to some aspects of the disclosed technology.

FIG. 14 is an illustrative example of a neural network 1400 (e.g., a deep-learning neural network) that can be used to implement machine-learning based feature segmentation, implicit-neural-representation generation, rendering, classification, object detection, image recognition (e.g., face recognition, object recognition, scene recognition, etc.), feature extraction, authentication, gaze detection, gaze prediction, and/or automation. For example, neural network 1400 may be an example of, or can implement, encoder 104 of FIG. 1, FIG. 7, FIG. 9, FIG. 10, and FIG. 11, object detector 204 of FIG. 2 and FIG. 3, one or more of the blocks of system 400 of FIG. 4.

An input layer 1402 includes input data. In one illustrative example, input layer 1402 can include data representing sample point clouds 108 of FIG. 1, point cloud 302 of FIG. 3, a colored point cloud from a RGB-D scan or a colorless point cloud sampled from the reconstructed scene mesh obtained by applying a neural reconstruction method to a RGB Video such as representation 502 of FIG. 5, a point cloud on which representation 602 of FIG. 6 may be based, a point cloud on which representation 604 of FIG. 6 may be based. Neural network 1400 includes multiple hidden layers, for example, hidden layers 1406*a*, 1406*b*, through 1406*n*. The hidden layers 1406*a*, 1406*b*, through hidden layer 1406*n* include "n" number of hidden layers, where "n" is an integer greater than or equal to one. The number of hidden layers can be made to include as many layers as needed for the given application. Neural network 1400 further includes an output layer 1404 that provides an output resulting from the processing performed by the hidden layers 1406*a*, 1406*b*, through 1406*n*. In one illustrative example, output layer 1404 can provide embedding space 110 of FIG. 1, shape embeddings 304 of FIG. 3, size and position information 306 of FIG. 3, "object class," "bounding box parameters," and a "CAD orientation" of FIG. 4, shape embeddings and shape size and position information on which representation 504 of FIG. 5 may be based, shape embeddings and shape size and position information on which representation 606 of FIG. 6 may be based, Neural network 1400 may be, or may include, a multilayer neural network of interconnected nodes. Each node can represent a piece of information. Information associated with the nodes is shared among the different layers and each layer retains information as information is processed. In some cases, neural network 1400 can include a feed-forward network, in which case there are no feedback connections where outputs of the network are fed back into itself. In some cases, neural network 1400 can include a recurrent neural network, which can have loops that allow information to be carried across nodes while reading in input.

Information can be exchanged between nodes through node-to-node interconnections between the various layers. Nodes of input layer 1402 can activate a set of nodes in the first hidden layer 1406*a*. For example, as shown, each of the input nodes of input layer 1402 is connected to each of the nodes of the first hidden layer 1406*a*. The nodes of first hidden layer 1406*a* can transform the information of each input node by applying activation functions to the input node information. The information derived from the transformation can then be passed to and can activate the nodes of the next hidden layer 1406*b*, which can perform their own designated functions. Example functions include convolutional, up-sampling, data transformation, and/or any other suitable functions. The output of the hidden layer 1406*b* can then activate nodes of the next hidden layer, and so on. The output of the last hidden layer 1406*n* can activate one or more nodes of the output layer 1404, at which an output is provided. In some cases, while nodes (e.g., node 1408) in neural network 1400 are shown as having multiple output lines, a node has a single output and all lines shown as being output from a node represent the same output value.

In some cases, each node or interconnection between nodes can have a weight that is a set of parameters derived from the training of neural network 1400. Once neural network 1400 is trained, it can be referred to as a trained neural network, which can be used to perform one or more operations. For example, an interconnection between nodes can represent a piece of information learned about the interconnected nodes. The interconnection can have a tunable numeric weight that can be tuned (e.g., based on a training dataset), allowing neural network 1400 to be adaptive to inputs and able to learn as more and more data is processed.

Neural network 1400 may be pre-trained to process the features from the data in the input layer 1402 using the different hidden layers 1406*a*, 1406*b*, through 1406*n* in order to provide the output through the output layer 1404. In an example in which neural network 1400 is used to identify features in images, neural network 1400 can be trained using training data that includes both images and labels, as described above. For instance, training images can be input into the network, with each training image having a label indicating the features in the images (for the feature-segmentation machine-learning system) or a label indicating classes of an activity in each image. In one example using object classification for illustrative purposes, a training image can include an image of a number 2, in which case the label for the image can be [0 0 1 0 0 0 0 0 0 0].

In some cases, neural network 1400 can adjust the weights of the nodes using a training process called backpropagation. As noted above, a backpropagation process can include a forward pass, a loss function, a backward pass, and a weight update. The forward pass, loss function, backward pass, and parameter update are performed for one training iteration. The process can be repeated for a certain number of iterations for each set of training images until neural network 1400 is trained well enough so that the weights of the layers are accurately tuned.

For the example of identifying objects in images, the forward pass can include passing a training image through neural network 1400. The weights are initially randomized before neural network 1400 is trained. As an illustrative example, an image can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for neural network 1400, the output will likely include values that do not give preference to any particular class due to the weights being randomly selected at initialization. For example, if the output is a vector with probabilities that the object includes different classes, the probability value for each of the different classes can be equal or at least very similar (e.g., for ten possible classes, each class can have a probability value of 0.1). With the initial weights, neural network 1400 is unable to determine low-level features and thus cannot make an accurate determination of what the classification of the object might be. A loss function can be used to analyze error in the output. Any suitable loss function definition can be used, such as a cross-entropy loss. Another example of a loss function includes the mean squared error (MSE), defined as $$E_{total} = \sum \frac{1}{2}(\text{target} - \text{output})^2.$$

The loss can be set to be equal to the value of $E_{total}$.

The loss (or error) will be high for the first training images since the actual values will be much different than the predicted output. The goal of training is to minimize the amount of loss so that the predicted output is the same as the training label. Neural network 1400 can perform a backward pass by determining which inputs (weights) most contributed to the loss of the network and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_1 - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

Neural network 1400 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. Neural network 1400 can include any other deep network other than a CNN, such as an autoencoder, a deep belief nets (DBNs), a Recurrent Neural Networks (RNNs), among others.

Figure 15:
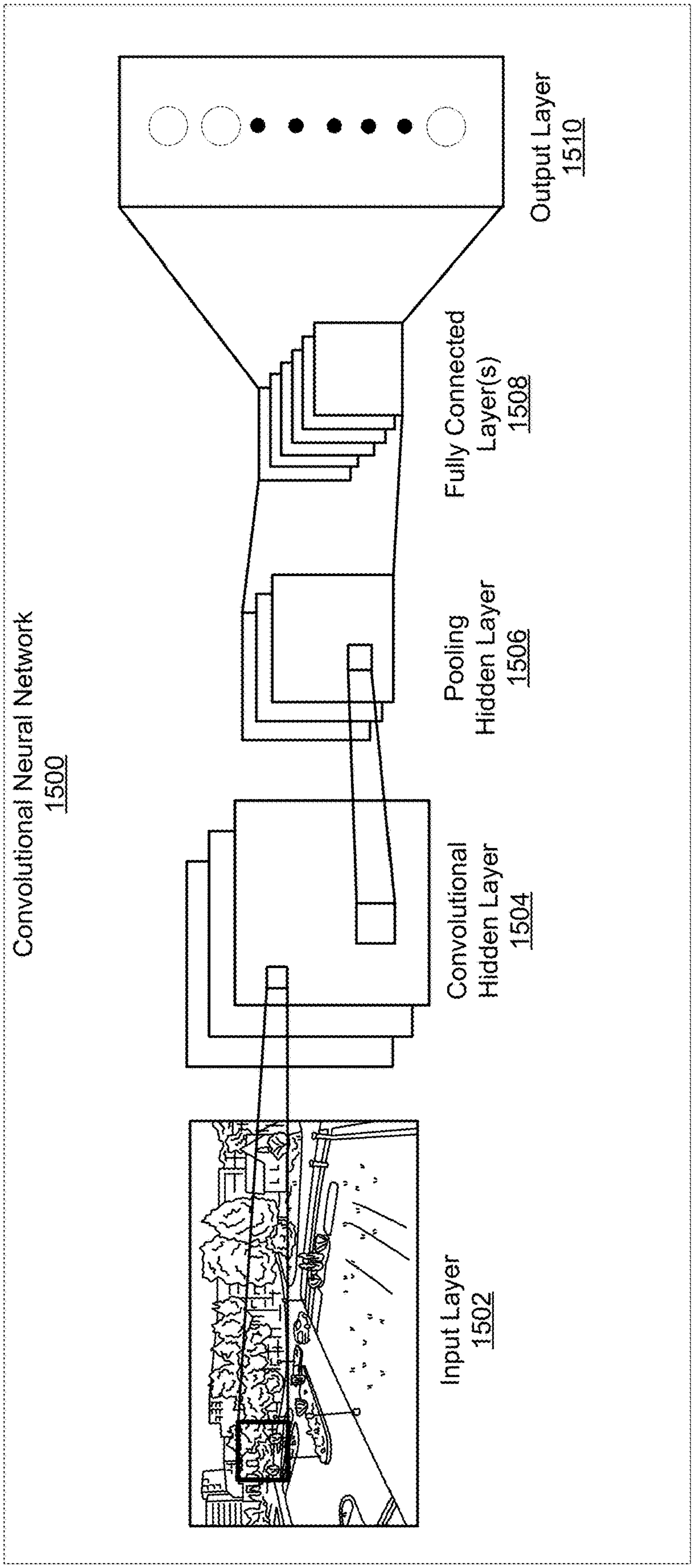
FIG. 15 is a block diagram illustrating an example of a convolutional neural network (CNN), according to various aspects of the present disclosure.

FIG. 15 is an illustrative example of a convolutional neural network (CNN) 1500. The input layer 1502 of the CNN 1500 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1504, an optional non-linear activation layer, a pooling hidden layer 1506, and fully connected layer 1508 (which fully connected layer 1508 can be hidden) to get an output at the output layer 1510. While only one of each hidden layer is shown in FIG. 15, one of ordinary skill will appreciate that multiple convolutional hidden layers, non-linear layers, pooling hidden layers, and/or fully connected layers can be included in the CNN 1500. As previously described, the output can indicate a single class of an object or can include a probability of classes that best describe the object in the image.

The first layer of the CNN 1500 can be the convolutional hidden layer 1504. The convolutional hidden layer 1504 can analyze image data of the input layer 1502. Each node of the convolutional hidden layer 1504 is connected to a region of nodes (pixels) of the input image called a receptive field. The convolutional hidden layer 1504 can be considered as one or more filters (each filter corresponding to a different activation or feature map), with each convolutional iteration of a filter being a node or neuron of the convolutional hidden layer 1504. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1504. Each connection between a node and a receptive field for that node learns a weight and, in some cases, an overall bias such that each node learns to analyze its particular local receptive field in the input image. Each node of the convolutional hidden layer 1504 will have the same weights and bias (called a shared weight and a shared bias). For example, the filter has an array of weights (numbers) and the same depth as the input. A filter will have a depth of 3 for an image frame example (according to three color components of the input image). An illustrative example size of the filter array is 5×5×3, corresponding to a size of the receptive field of a node.

The convolutional nature of the convolutional hidden layer 1504 is due to each node of the convolutional layer being applied to its corresponding receptive field. For example, a filter of the convolutional hidden layer 1504 can begin in the top-left corner of the input image array and can convolve around the input image. As noted above, each convolutional iteration of the filter can be considered a node or neuron of the convolutional hidden layer 1504. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1504. For example, a filter can be moved by a step amount (referred to as a stride) to the next receptive field. The stride can be set to 1 or any other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1504.

The mapping from the input layer to the convolutional hidden layer 1504 is referred to as an activation map (or feature map). The activation map includes a value for each node representing the filter results at each location of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 1504 can include several activation maps in order to identify multiple features in an image. The example shown in FIG. 15 includes three activation maps. Using three activation maps, the convolutional hidden layer 1504 can detect three different kinds of features, with each feature being detectable across the entire image.

In some examples, a non-linear hidden layer can be applied after the convolutional hidden layer 1504. The non-linear layer can be used to introduce non-linearity to a system that has been computing linear operations. One illustrative example of a non-linear layer is a rectified linear unit (ReLU) layer. A RcLU layer can apply the function f(x)=max(0, x) to all of the values in the input volume, which changes all the negative activations to 0. The ReLU can thus increase the non-linear properties of the CNN 1500 without affecting the receptive fields of the convolutional hidden layer 1504.

The pooling hidden layer 1506 can be applied after the convolutional hidden layer 1504 (and after the non-linear hidden layer when used). The pooling hidden layer 1506 is used to simplify the information in the output from the convolutional hidden layer 1504. For example, the pooling hidden layer 1506 can take each activation map output from the convolutional hidden layer 1504 and generates a condensed activation map (or feature map) using a pooling function. Max-pooling is one example of a function performed by a pooling hidden layer. Other forms of pooling functions be used by the pooling hidden layer 1506, such as average pooling, L2-norm pooling, or other suitable pooling functions. A pooling function (e.g., a max-pooling filter, an L2-norm filter, or other suitable pooling filter) is applied to each activation map included in the convolutional hidden layer 1504. In the example shown in FIG. 15, three pooling filters are used for the three activation maps in the convolutional hidden layer 1504.

In some examples, max-pooling can be used by applying a max-pooling filter (e.g., having a size of 2×2) with a stride (e.g., equal to a dimension of the filter, such as a stride of 2) to an activation map output from the convolutional hidden layer 1504. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1504 having a dimension of 24×24 nodes, the output from the pooling hidden layer 1506 will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling) and using the computed values as an output.

The pooling function (e.g., max-pooling, L2-norm pooling, or other pooling function) determines whether a given feature is found anywhere in a region of the image and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1500.

The final layer of connections in the network is a fully-connected layer that connects every node from the pooling hidden layer 1506 to every one of the output nodes in the output layer 1510. Using the example above, the input layer includes 28×28 nodes encoding the pixel intensities of the input image, the convolutional hidden layer 1504 includes 3×24×24 hidden feature nodes based on application of a 5×5 local receptive field (for the filters) to three activation maps, and the pooling hidden layer 1506 includes a layer of 3×12×12 hidden feature nodes based on application of max-pooling filter to 2×2 regions across each of the three feature maps. Extending this example, the output layer 1510 can include ten output nodes. In such an example, every node of the 3×12×12 pooling hidden layer 1506 is connected to every node of the output layer 1510.

The fully connected layer 1508 can obtain the output of the previous pooling hidden layer 1506 (which should represent the activation maps of high-level features) and determines the features that most correlate to a particular class. For example, the fully connected layer 1508 can determine the high-level features that most strongly correlate to a particular class and can include weights (nodes) for the high-level features. A product can be computed between the weights of the fully connected layer 1508 and the pooling hidden layer 1506 to obtain probabilities for the different classes. For example, if the CNN 1500 is being used to predict that an object in an image is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1510 can include an M-dimensional vector (in the prior example, M=10). M indicates the number of classes that the CNN 1500 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 16:
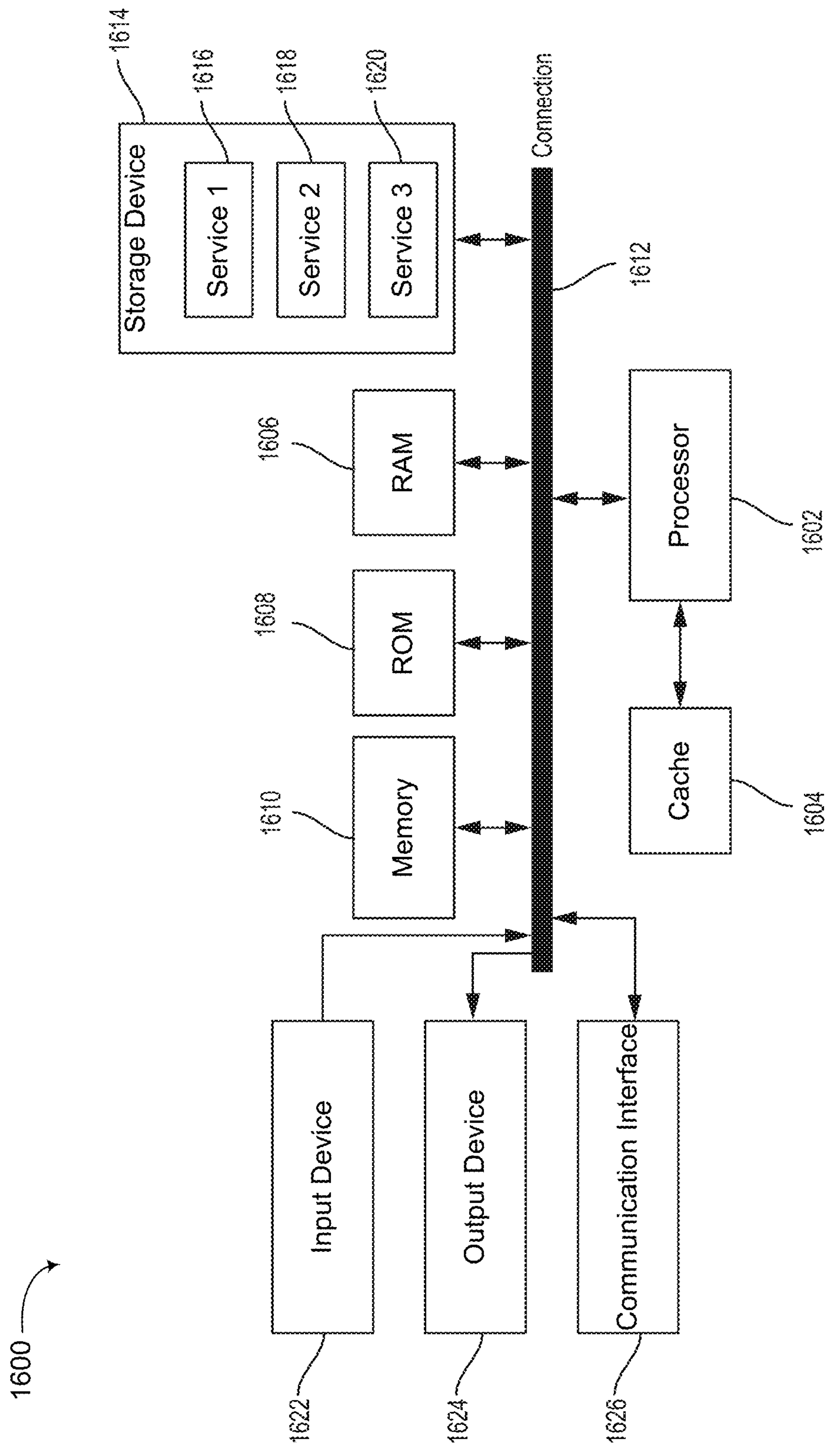
FIG. 16 is a block diagram illustrating an example computing-device architecture of an example computing device which can implement the various techniques described herein.

FIG. 16 illustrates an example computing-device architecture 1600 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing-device architecture 1600 may include, implement, or be included in any or all of system 100 of FIG. 1, trainer 102 of FIG. 1, encoder 104 of FIG. 1, system 200 of FIG. 2, trainer 202 of FIG. 2, object detector 204 of FIG. 2 and FIG. 3, system 300 of FIG. 3, modeler 308 of FIG. 3, trainer 702 of FIG. 7, trainer 902 of FIG. 9, trainer 1002 of FIG. 10, trainer 1102 of FIG. 11 and/or other devices, modules, or systems described herein. Additionally or alternatively, computing-device architecture 1600 may be configured to perform process 1200, process 1300, and/or other process described herein.

The components of computing-device architecture 1600 are shown in electrical communication with each other using connection 1612, such as a bus. The example computing-device architecture 1600 includes a processing unit (CPU or processor) 1602 and computing device connection 1612 that couples various computing device components including computing device memory 1610, such as read only memory (ROM) 1608 and random-access memory (RAM) 1606, to processor 1602.

Computing-device architecture 1600 can include a cache of high-speed memory connected directly with, in close proximity to, or integrated as part of processor 1602. Computing-device architecture 1600 can copy data from memory 1610 and/or the storage device 1614 to cache 1604 for quick access by processor 1602. In this way, the cache can provide a performance boost that avoids processor 1602 delays while waiting for data. These and other modules can control or be configured to control processor 1602 to perform various actions. Other computing device memory 1610 may be available for use as well. Memory 1610 can include multiple different types of memory with different performance characteristics. Processor 1602 can include any general-purpose processor and a hardware or software service, such as service 1 1616, service 2 1618, and service 3 1620 stored in storage device 1614, configured to control processor 1602 as well as a special-purpose processor where software instructions are incorporated into the processor design. Processor 1602 may be a self-contained system, containing multiple cores or processors, a bus, memory controller, cache, etc. A multi-core processor may be symmetric or asymmetric.

To enable user interaction with the computing-device architecture 1600, input device 1622 can represent any number of input mechanisms, such as a microphone for speech, a touch-sensitive screen for gesture or graphical input, keyboard, mouse, motion input, speech and so forth. Output device 1624 can also be one or more of a number of output mechanisms known to those of skill in the art, such as a display, projector, television, speaker device, etc. In some instances, multimodal computing devices can enable a user to provide multiple types of input to communicate with computing-device architecture 1600. Communication interface 1626 can generally govern and manage the user input and computing device output. There is no restriction on operating on any particular hardware arrangement and therefore the basic features here may easily be substituted for improved hardware or firmware arrangements as they are developed.

Storage device 1614 is a non-volatile memory and can be a hard disk or other types of computer readable media which can store data that are accessible by a computer, such as magnetic cassettes, flash memory cards, solid state memory devices, digital versatile disks, cartridges, random-access memories (RAMs) 1606, read only memory (ROM) 1608, and hybrids thereof. Storage device 1614 can include services 1616, 1618, and 1620 for controlling processor 1602. Other hardware or software modules are contemplated. Storage device 1614 can be connected to the computing device connection 1612. In one aspect, a hardware module that performs a particular function can include the software component stored in a computer-readable medium in connection with the necessary hardware components, such as processor 1602, connection 1612, output device 1624, and so forth, to carry out the function.

The term "substantially," in reference to a given parameter, property, or condition, may refer to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, magnetic or optical disks, USB devices provided with non-volatile memory, networked storage devices, any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general-purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general-purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, such as, a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Various aspects of the application will be described with respect to the figures. Appendix A, which is incorporated herein by reference in its entirety and for all purposes, includes example Aspects of the systems and techniques described herein.

Illustrative aspects of the disclosure include:

Aspect 1. An apparatus for generating embedding vectors, the apparatus comprising: at least one memory; and at least one processor coupled to the at least one memory and configured to: map, using a machine-learning encoder, a plurality of query point clouds and a plurality of sample point clouds associated with the plurality of query point clouds; and encode the plurality of sample point clouds using the machine-learning encoder to generate an embedding space for a plurality of three-dimensional models.

Aspect 2. The apparatus of aspect 1, wherein in the embedding space, geometrically similar objects are represented by similar embedding vectors and geometrically dissimilar objects are represented by dissimilar embedding vectors.

Aspect 3. The apparatus of any one of aspects 1 or 2, wherein the at least one processor is further configured to train a machine-learning segmenter to segment point clouds representative of scenes into object points and background points.

Aspect 4. The apparatus of aspect 3, wherein, to train the machine-learning segmenter to segment point clouds representative of scenes, the at least one processor is configured to: cause the machine-learning segmenter to output a segmentation map for a query point cloud of the plurality of query point clouds; determine a segmentation loss based on a difference between the segmentation map and a ground-truth segmentation map corresponding to the query point cloud; and modify parameters of the machine-learning segmenter based on the segmentation loss.

Aspect 5. The apparatus of any one of aspects 1 to 4, wherein the at least one processor is further configured to train a machine-learning distance predicter to predict distances between query point clouds of the plurality of query point clouds and sample point clouds of the plurality of sample point clouds.

Aspect 6. The apparatus of aspect 5, wherein, to train the machine-learning distance predicter, the at least one processor is configured to: determine a positive difference between a query point cloud of the plurality of query point clouds and a positive point cloud of the plurality of sample point clouds; determine a negative difference between the query point cloud and a negative point cloud of the plurality of sample point clouds; determine a loss based on the positive difference and the negative difference; and modifying parameters of the machine-learning distance predicter based on the loss.

Aspect 7. The apparatus of aspect 6, wherein: the positive difference comprises a Chamfer distance between the query point cloud and the positive point cloud; and the negative difference comprises a Chamfer distance between the query point cloud and the negative point cloud.

Aspect 8. The apparatus of any one of aspects 1 to 7, wherein, to map the plurality of query point clouds and the plurality of sample point clouds, the at least one processor is configured to train, using contrastive learning, the machine-learning encoder based on the plurality of query point clouds and the plurality of sample point clouds.

Aspect 9. The apparatus of aspect 8, wherein, to train the machine-learning encoder, the at least one processor is configured to train the machine-learning encoder based on a segmentation loss determined based on query point clouds of the plurality of query point clouds.

Aspect 10. The apparatus of any one of aspects 8 or 9, wherein, to train the machine-learning encoder, the at least one processor is configured to: cause a machine-learning segmenter to output a segmentation map for a query point cloud of the plurality of query point clouds; determine a segmentation loss based on a difference between the segmentation map and a ground-truth segmentation map corresponding to the query point cloud; and modify parameters of the machine-learning encoder based on the segmentation loss.

Aspect 11. The apparatus of any one of aspects 8 to 10, wherein, to train the machine-learning encoder, the at least one processor is configured to train the machine-learning encoder based on differences between query point clouds of the plurality of query point clouds and sample point clouds of the plurality of sample point clouds.

Aspect 12. The apparatus of aspect 11, wherein the differences between query point clouds of the plurality of query point clouds and sample point clouds of the plurality of sample point clouds comprise Chamfer distances between query point clouds of the plurality of query point clouds and sample point clouds of the plurality of sample point clouds.

Aspect 13. The apparatus of any one of aspects 8 to 12, wherein, to train the machine-learning encoder, the at least one processor is configured to: determine a positive difference between a query point cloud of the plurality of query point clouds and a positive point cloud of the plurality of sample point clouds; determine a negative difference between the query point cloud and a negative point cloud of the plurality of sample point clouds; determine a loss based on the positive difference and the negative difference; and modify parameters of the machine-learning encoder based on the loss.

Aspect 14. The apparatus of aspect 13, wherein: the positive difference comprises a Chamfer distance between the query point cloud and the positive point cloud; and the negative difference comprises a Chamfer distance between the query point cloud and the negative point cloud.

Aspect 15. The apparatus of any one of aspects 8 to 14, wherein, to train the machine-learning encoder, the at least one processor is configured to train the machine-learning encoder based on chamfer distances differences between sample point clouds of the plurality of sample point clouds.

Aspect 16. The apparatus of any one of aspects 1 to 15, wherein the at least one processor is further configured to train a machine-learning model using the embedding space.

Aspect 17. The apparatus of aspect 16, wherein the machine-learning model is trained to regress the embedding space.

Aspect 18. The apparatus of any one of aspects 16 or 17, wherein the machine-learning model is trained to: identify one or more objects in a scene based on a point cloud representative of the scene; and generate one or more respective shape embeddings for the one or more objects.

Aspect 19. The apparatus of any one of aspects 1 to 18, wherein the at least one processor is further configured to: generate, using a machine-learning model, based on a point cloud representative of a scene, a shape embedding representative of an object in the scene; compare the shape embedding to shape embeddings of the embedding space to determine a matching shape embedding of the embedding space; and correlate the object with a model based on a relationship between the model and the matching shape embedding.

Aspect 20. The apparatus of aspect 19, wherein the at least one processor is further configured to model the scene using the model.

Aspect 21. The apparatus of any one of aspects 19 or 20, wherein the at least one processor is configured to generate, using the machine-learning model, based on the point cloud representative of the scene, a bounding box indicative of a position of the object in the scene, and an indication of an orientation of the object.

Aspect 22. The apparatus of any one of aspects 1 to 21, wherein each sample point cloud of the plurality of sample point clouds is based on a respective model of an object.

Aspect 23. The apparatus of any one of aspects 1 to 22, wherein each query point cloud of the plurality of query point clouds is based on a respective simulated point-cloud capture of an object or a point-cloud capture of an object.

Aspect 24. A method for generating embedding vectors, the method comprising: mapping, using a machine-learning encoder, a plurality of query point clouds and a plurality of sample point clouds associated with the plurality of query point clouds; and encoding the plurality of sample point clouds using the machine-learning encoder to generate an embedding space for a plurality of three-dimensional models.

Aspect 25. The method of aspect 24, wherein in the embedding space, geometrically similar objects are represented by similar embedding vectors and geometrically dissimilar objects are represented by dissimilar embedding vectors.

Aspect 26. The method of any one of aspects 24 or 25, further comprising training a machine-learning segmenter to segment point clouds representative of scenes into object points and background points.

Aspect 27. The method of aspect 26, wherein training the machine-learning segmenter to segment point clouds representative of scenes comprises: causing the machine-learning segmenter to output a segmentation map for a query point cloud of the plurality of query point clouds; determining a segmentation loss based on a difference between the segmentation map and a ground-truth segmentation map corresponding to the query point cloud; and modifying parameters of the machine-learning segmenter based on the segmentation loss.

Aspect 28. The method of any one of aspects 24 to 27, further comprising training a machine-learning distance predicter to predict distances between query point clouds of the plurality of query point clouds and sample point clouds of the plurality of sample point clouds.

Aspect 29. The method of aspect 28, wherein training the machine-learning distance predicter comprises: determining a positive difference between a query point cloud of the plurality of query point clouds and a positive point cloud of the plurality of sample point clouds; determining a negative difference between the query point cloud and a negative point cloud of the plurality of sample point clouds; determining a loss based on the positive difference and the negative difference; and modifying parameters of the machine-learning distance predicter based on the loss.

Aspect 30. The method of aspect 29, wherein: the positive difference comprises a Chamfer distance between the query point cloud and the positive point cloud; and the negative difference comprises a Chamfer distance between the query point cloud and the negative point cloud.

Aspect 31. The method of any one of aspects 24 to 30, mapping the plurality of query point clouds and the plurality of sample point clouds comprises training, using contrastive learning, the machine-learning encoder based on the plurality of query point clouds and the plurality of sample point clouds.

Aspect 32. The method of aspect 31, wherein training the machine-learning encoder further comprises training the machine-learning encoder based on a segmentation loss determined based on query point clouds of the plurality of query point clouds.

Aspect 33. The method of any one of aspects 31 or 32, wherein training the machine-learning encoder further comprises: causing a machine-learning segmenter to output a segmentation map for a query point cloud of the plurality of query point clouds; determining a segmentation loss based on a difference between the segmentation map and a ground-truth segmentation map corresponding to the query point cloud; and modifying parameters of the machine-learning encoder based on the segmentation loss.

Aspect 34. The method of any one of aspects 31 to 33, wherein training the machine-learning encoder further comprises training the machine-learning encoder based on differences between query point clouds of the plurality of query point clouds and sample point clouds of the plurality of sample point clouds.

Aspect 35. The method of aspect 34, wherein the differences between query point clouds of the plurality of query point clouds and sample point clouds of the plurality of sample point clouds comprise Chamfer distances between query point clouds of the plurality of query point clouds and sample point clouds of the plurality of sample point clouds.

Aspect 36. The method of any one of aspects 31 to 35, wherein training the machine-learning encoder further comprises: determining a positive difference between a query point cloud of the plurality of query point clouds and a positive point cloud of the plurality of sample point clouds; determining a negative difference between the query point cloud and a negative point cloud of the plurality of sample point clouds; determining a loss based on the positive difference and the negative difference; and modifying parameters of the machine-learning encoder based on the loss.

Aspect 37. The method of aspect 36, wherein: the positive difference comprises a Chamfer distance between the query point cloud and the positive point cloud; and the negative difference comprises a Chamfer distance between the query point cloud and the negative point cloud.

Aspect 38. The method of any one of aspects 31 to 37, wherein training the machine-learning encoder further comprises training the machine-learning encoder based on chamfer distances differences between sample point clouds of the plurality of sample point clouds.

Aspect 39. The method of any one of aspects 24 to 38, further comprising training a machine-learning model using the embedding space.

Aspect 40. The method of aspect 39, wherein the machine-learning model is trained to regress the embedding space.

Aspect 41. The method of any one of aspects 39 or 40, wherein the machine-learning model is trained to: identify one or more objects in a scene based on a point cloud representative of the scene; and generate one or more respective shape embeddings for the one or more objects.

Aspect 42. The method of any one of aspects 24 to 41, further comprising: generating, using a machine-learning model, based on a point cloud representative of a scene, a shape embedding representative of an object in the scene; comparing the shape embedding to shape embeddings of the embedding space to determine a matching shape embedding of the embedding space; and correlating the object with a model based on a relationship between the model and the matching shape embedding.

Aspect 43. The method of aspect 42, further comprising modeling the scene using the model.

Aspect 44. The method of any one of aspects 42 or 43, further comprising generating, using the machine-learning model, based on the point cloud representative of the scene, a bounding box indicative of a position of the object in the scene, and an indication of an orientation of the object.

Aspect 45. The method of any one of aspects 24 to 44, wherein each sample point cloud of the plurality of sample point clouds is based on a respective model of an object.

Aspect 46. The method of any one of aspects 24 to 45, wherein each query point cloud of the plurality of query point clouds is based on a respective simulated point-cloud capture of an object or a point-cloud capture of an object.

Aspect 47. An apparatus for detecting objects, the apparatus comprising: at least one memory; and at least one processor coupled to the at least one memory and configured to: generate, using a machine-learning model, a shape embedding based on an input point cloud representative of a scene; compare the shape embedding to shape embeddings of an embedding space to determine a matching shape embedding of the embedding space; and correlate an object in the scene with a model based on a relationship between the model and the matching shape embedding.

Aspect 48. The apparatus of aspect 47, wherein in the embedding space, geometrically similar objects are represented by similar embedding vectors and geometrically dissimilar objects are represented by dissimilar embedding vectors.

Aspect 49. The apparatus of any one of aspects 47 or 48, wherein the embedding space is determined by an encoder trained through contrastive learning, based on a plurality of query point clouds and a plurality of sample point clouds associated with the plurality of query point clouds.

Aspect 50. The apparatus of any one of aspects 47 to 49, wherein the at least one processor is configured to model the scene using the model.

Aspect 51. The apparatus of any one of aspects 47 to 50, wherein the at least one processor is configured to generate, using the machine-learning model, based on the input point cloud representative of the scene, a bounding box indicative of a position of the object in the scene, and an indication of an orientation of the object.

Aspect 52. An method for detecting objects, the method comprising: generating, using a machine-learning model, a shape embedding based on an input point cloud representative of a scene; comparing the shape embedding to shape embeddings of an embedding space to determine a matching shape embedding of the embedding space; and correlating an object in the scene with a model based on a relationship between the model and the matching shape embedding.

Aspect 53. The method of aspect 52, wherein in the embedding space, geometrically similar objects are represented by similar embedding vectors and geometrically dissimilar objects are represented by dissimilar embedding vectors.

Aspect 54. The method of any one of aspects 52 or 53, wherein the embedding space is determined by an encoder trained through contrastive learning, based on a plurality of query point clouds and a plurality of sample point clouds associated with the plurality of query point clouds.

Aspect 55. The method of any one of aspects 52 to 54, further comprising modelling the scene using the model.

Aspect 56. The method of any one of aspects 52 to 55, further comprising generating, using the machine-learning model, based on the input point cloud representative of the scene, a bounding box indicative of a position of the object in the scene, and an indication of an orientation of the object.

Aspect 57. A non-transitory computer-readable storage medium having stored thereon instructions that, when executed by at least one processor, cause the at least one processor to perform operations according to any of aspects 24 to 46 or 52 to 56.

Aspect 58. An apparatus for providing virtual content for display, the apparatus comprising one or more means for perform operations according to any of aspects 24 to 46 or 52 to 56.

What is claimed is:

1. An apparatus for generating embedding vectors, the apparatus comprising:

at least one memory; and at least one processor coupled to the at least one memory and configured to:

map, using a machine-learning encoder, a plurality of query point clouds and a plurality of sample point clouds associated with the plurality of query point clouds; and encode the plurality of sample point clouds using the machine-learning encoder to generate an embedding space for a plurality of three-dimensional models, wherein, to map the plurality of query point clouds and the plurality of sample point clouds, the at least one processor is configured to train, using contrastive learning, the machine-learning encoder based on the plurality of query point clouds and the plurality of sample point clouds.

2. The apparatus of claim 1, wherein in the embedding space, geometrically similar objects are represented by similar embedding vectors and geometrically dissimilar objects are represented by dissimilar embedding vectors.

3. The apparatus of claim 1, wherein the at least one processor is further configured to train a machine-learning segmenter to segment point clouds representative of scenes into object points and background points.

4. The apparatus of claim 3, wherein, to train the machine-learning segmenter to segment point clouds representative of scenes, the at least one processor is configured to:

cause the machine-learning segmenter to output a segmentation map for a query point cloud of the plurality of query point clouds;

determine a segmentation loss based on a difference between the segmentation map and a ground-truth segmentation map corresponding to the query point cloud; and modify parameters of the machine-learning segmenter based on the segmentation loss.

5. The apparatus of claim 1, wherein the at least one processor is further configured to train a machine-learning distance predicter to predict distances between query point clouds of the plurality of query point clouds and sample point clouds of the plurality of sample point clouds.

6. The apparatus of claim 5, wherein, to train the machine-learning distance predicter, the at least one processor is configured to:

determine a positive difference between a query point cloud of the plurality of query point clouds and a positive point cloud of the plurality of sample point clouds;

determine a negative difference between the query point cloud and a negative point cloud of the plurality of sample point clouds;

determine a loss based on the positive difference and the negative difference; and modifying parameters of the machine-learning distance predicter based on the loss.

7. The apparatus of claim 1, wherein, to train the machine-learning encoder, the at least one processor is configured to:

cause a machine-learning segmenter to output a segmentation map for a query point cloud of the plurality of query point clouds;

determine a segmentation loss based on a difference between the segmentation map and a ground-truth segmentation map corresponding to the query point cloud; and modify parameters of the machine-learning encoder based on the segmentation loss.

8. The apparatus of claim 1, wherein, to train the machine-learning encoder, the at least one processor is configured to:

determine a positive difference between a query point cloud of the plurality of query point clouds and a positive point cloud of the plurality of sample point clouds;

determine a negative difference between the query point cloud and a negative point cloud of the plurality of sample point clouds;

determine a loss based on the positive difference and the negative difference; and modify parameters of the machine-learning encoder based on the loss.

9. The apparatus of claim 1, wherein the at least one processor is further configured to train a machine-learning model using the embedding space.

10. The apparatus of claim 9, wherein the machine-learning model is trained to regress the embedding space.

11. The apparatus of claim 9 wherein the machine-learning model is trained to:

identify one or more objects in a scene based on a point cloud representative of the scene; and generate one or more respective shape embeddings for the one or more objects.

12. The apparatus of claim 1, wherein the at least one processor is further configured to:

generate, using a machine-learning model, based on a point cloud representative of a scene, a shape embedding representative of an object in the scene;

compare the shape embedding to shape embeddings of the embedding space to determine a matching shape embedding of the embedding space; and correlate the object with a model based on a relationship between the model and the matching shape embedding.

13. The apparatus of claim 12, wherein the at least one processor is further configured to model the scene using the model.

14. The apparatus of claim 12, wherein the at least one processor is configured to generate, using the machine-learning model, based on the point cloud representative of the scene, a bounding box indicative of a position of the object in the scene, and an indication of an orientation of the object.

15. A non-transitory computer-readable storage medium having stored thereon instructions that, when executed by at least one processor, cause the at least one processor to:

map, using a machine-learning encoder, a plurality of query point clouds and a plurality of sample point clouds associated with the plurality of query point clouds by training, using contrastive learning, the machine-learning encoder based on the plurality of query point clouds and the plurality of sample point clouds; and encode the plurality of sample point clouds using the machine-learning encoder to generate an embedding space for a plurality of three-dimensional models.

16. An apparatus for detecting objects, the apparatus comprising:

at least one memory; and at least one processor coupled to the at least one memory and configured to:

generate, using a machine-learning model, a shape embedding based on an input point cloud representative of a scene;

compare the shape embedding to shape embeddings of an embedding space to determine a matching shape embedding of the embedding space; and correlate an object in the scene with a model based on a relationship between the model and the matching shape embedding.

17. The apparatus of claim 16, wherein the embedding space is determined by an encoder trained through contrastive learning, based on a plurality of query point clouds and a plurality of sample point clouds associated with the plurality of query point clouds.

18. The apparatus of claim 16, wherein the at least one processor is configured to model the scene using the model.

19. The apparatus of claim 16, wherein the at least one processor is configured to generate, using the machine-learning model, based on the input point cloud representative of the scene, a bounding box indicative of a position of the object in the scene, and an indication of an orientation of the object.

* * * * *